(12) United States Patent
Ben-Aissa

(10) Patent No.: US 7,229,013 B2
(45) Date of Patent: *Jun. 12, 2007

(54) BIOMETRIC MULTI-PURPOSE TERMINAL, PAYROLL AND WORK MANAGEMENT SYSTEM AND RELATED METHODS

(75) Inventor: Nebil Ben-Aissa, Palatine, IL (US)

(73) Assignee: American EPS, Inc., Chicago, IL (US)

( * ) Notice: Subject to any disclaimer, the term of this patent is extended or adjusted under 35 U.S.C. 154(b) by 75 days.

This patent is subject to a terminal disclaimer.

(21) Appl. No.: 10/894,498

(22) Filed: Jul. 20, 2004

(65) Prior Publication Data

US 2005/0109836 A1 May 26, 2005

Related U.S. Application Data

(63) Continuation-in-part of application No. 10/183,767, filed on Jun. 27, 2002, now Pat. No. 6,764,013.

(60) Provisional application No. 60/372,983, filed on Apr. 17, 2002.

(51) Int. Cl.
*G06K 5/00* (2006.01)
(52) U.S. Cl. ...................................... 235/380; 235/385
(58) Field of Classification Search ................ 235/380, 235/382, 385, 487, 492
See application file for complete search history.

(56) References Cited

U.S. PATENT DOCUMENTS

| | | | |
|---|---|---|---|
| 4,170,015 A | 10/1979 | Elliano et al. | |
| 4,218,627 A | 8/1980 | Kiesel | |
| 4,270,043 A | 5/1981 | Baxter et al. | |
| 4,323,771 A | 4/1982 | Chalker et al. | |
| 4,376,887 A | 3/1983 | Greenaway et al. | |
| 4,401,994 A | 8/1983 | Witts et al. | |
| 4,466,078 A | 8/1984 | Treiman | |
| 4,542,286 A | 9/1985 | Golarz | |
| 4,658,357 A | 4/1987 | Carroll et al. | |
| 4,819,162 A | 4/1989 | Webb, Jr. et al. | |
| 5,129,652 A | 7/1992 | Wilkinson | |
| 5,255,183 A | 10/1993 | Katz | |
| 5,276,314 A | 1/1994 | Martino et al. | |
| 5,336,870 A | 8/1994 | Hughes et al. | |

(Continued)

*Primary Examiner*—Daniel Stcyr
(74) *Attorney, Agent, or Firm*—Cook, Alex, McFarron, Manzo, Cummings & Mehler, Ltd.

(57) ABSTRACT

Employees gain access to a payroll and work management system by authentication at a multi-purpose terminal with a bankcard encoded with a unique account number and a personal identification number (PIN). The terminal may then be used to check-in and checkout of work, to receive new work instructions or assignments, to review payroll details, to print a payroll stub, to execute financial transactions, to print a receipt of financial transactions or to review or to upload the results of work quality audits. The invention also includes systems and methods that utilize such multi-purpose terminals to calculate the payroll and deductions for each employee and to issue electronic fund transfers from the employer's bank account to deposit the net pay in a bank account associated with each employee's bankcard so that the pay is immediately accessible by each employee, such as by withdrawal of cash at an ATM or by purchases at a point of sale. Electronic payrolls may be processed and employee's accounts credited with pay on a daily basis, or on any preset period of time, including hourly.

52 Claims, 40 Drawing Sheets

U.S. PATENT DOCUMENTS

| | | |
|---|---|---|
| 5,453,601 A | 9/1995 | Rosen |
| 5,459,657 A | 10/1995 | Wynn et al. |
| 5,477,038 A | 12/1995 | Levine et al. |
| 5,550,359 A | 8/1996 | Bennett |
| 5,600,554 A | 2/1997 | Williams |
| 5,646,839 A | 7/1997 | Katz |
| 5,717,867 A | 2/1998 | Wynn et al. |
| 5,754,655 A | 5/1998 | Hughes et al. |
| 5,842,128 A | 11/1998 | Bonner et al. |
| 5,991,742 A | 11/1999 | Tran |
| 6,012,048 A | 1/2000 | Gustin et al. |
| RE37,122 E | 4/2001 | Levine et al. |
| 6,298,335 B1 | 10/2001 | Bernstein |
| 6,347,306 B1 | 2/2002 | Swart |
| 6,366,929 B1 | 4/2002 | Dartigues et al. |
| 6,408,337 B1 | 6/2002 | Dietz et al. |
| 6,473,500 B1 | 10/2002 | Risafi et al. |
| 6,697,947 B1 * | 2/2004 | Matyas et al. ............... 713/182 |
| 6,764,013 B2 * | 7/2004 | Ben-Aissa ............. 235/472.01 |
| 6,883,709 B2 * | 4/2005 | Joseph ....................... 235/381 |
| 2001/0011684 A1 | 8/2001 | Krause |
| 2001/0032119 A1 | 10/2001 | Bode |
| 2001/0042032 A1 | 11/2001 | Crawshaw et al. |
| 2001/0044756 A1 | 11/2001 | Watkins et al. |
| 2001/0049619 A1 | 12/2001 | Powell et al. |
| 2002/0029272 A1 | 3/2002 | Weller et al. |

* cited by examiner

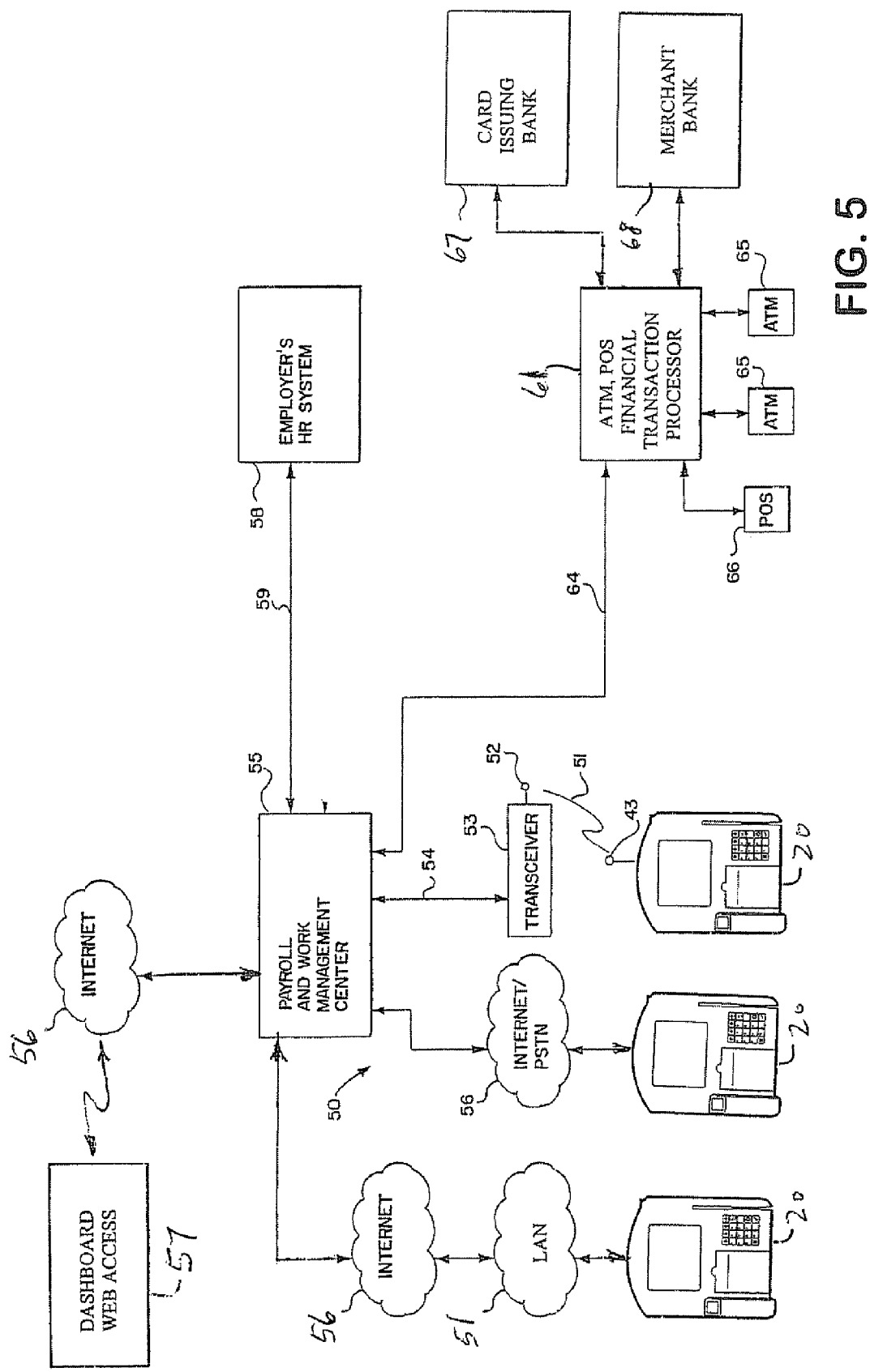

```
Missed Punch of Crew 1
Employee entered Punch-IN time:
         06:33 AM

Enter new Punch-IN time
         07:00 AM
         Hour Minutes

[X] Cancel   [↑] AM/PM   Save [✓]
```

FIG. 20E

```
Missed Punch of Crew 1
Employee entered Punch-IN date:
         06/04/2004

Enter new Punch-IN date
         06/04/04
         MM  DD  YY

[X] Cancel              Save [✓]
```

FIG. 20F

```
Missed Punch of Crew 1
Missed Punch-IN: 06/04/2004 07:00 AM
Punch-OUT time: 06/04/2004 03:00 PM

[1] Edit missed Punch-IN time
[2] Edit missed Punch-IN date
[3] Approve missed Punch-IN
```

No more missed punches to correct

[X] Proceed
```

ACCOUNT INFORMATION

1. PAYROLL INFORMATION
2. CARD BALANCE
3. GET A PAYROLL ADVANCE

[X] PREVIOUS

FIG. 25B

DEAR CARD HOLDER
YOU CAN RECEIVE A PAYROLL ADVANCE
UP TO $195.00

PLEASE ENTER YOUR DESIRED AMOUNT,
THEN PRESS SUBMIT

[ $135.00 ]

[X] PREVIOUS      [✓] SUBMIT

FIG. 25C

DEAR CARD HOLDER
YOU WILL INCUR A $2.50 SERVICE FEE
FOR YOUR PAYROLL ADVANCE

PLEASE ENTER YOUR
PERSONAL IDENTIFICATION NUMBER
THEN PRESS SUBMIT TO CONFIRM

[ **** ]

[X] PREVIOUS      [✓] SUBMIT

FIG. 25D

YOUR PAYROLL ADVANCE
HAS BEEN APPROVED!

$135.00 HAS BEEN ADDED TO
YOUR CARD ACCOUNT

[X] EXIT      [✓] NEXT

FIG. 30

EMPLOYEE IS AUTHENTICATED/AUTHORIZED

↓

TODAY IS PAYDAY, DO YOU WANT TO PRINT YOUR PAYSTUB?

↓

PRINT PAYSTUB
- YES → PRINT THE PAYSTUB, STORE THAT STUB WAS PRINTED THEN SEND IT TO SERVER
- NO ↓

STORE THAT STUB WAS NOT PRINTED, THEN SEND TO SERVER

↓ DISPLAY PAY STUB SUMMARY

```
PAYROLL INFORMATION
CHECK DATE: 07/26/2003
CHK NUMBER: 1867483
  FROM: 07/01/2003
  TO: 07/15/2003

[X] GO BACK   [🖨] PRINT   VIEW [✓]
```

↓

PROCEED WITH NORMAL DEVICE OPERATION

↓

SEND TO SERVER IF EMPLOYEE PRINTED HIS/PAY STUB OR NOT (IN ORDER TO COMPLY WITH LABOR LAWS)

PRINT THE PAYROLL STUB

| | | |
|---|---|---|
| Bob Supervisor | | 7/1/2002 |
| From | | 7/15/2002 |
| To | | 7/26/2002 |
| Check Date | | 7/6/2204 |
| Check Number | | |

Hours Summary

| Description | Current | Y-T-D |
|---|---|---|
| EARNINGS | | |
| Salary | 1000 | 1000 |
| Reg Earn 1 | 0 | 12635.5 |
| 0/1 1 Earnings | 0 | 1112.75 |
| Total Earnings | 1000 | 14747.25 |
| DEDUCTIONS | | |
| Federal W/Muuu | 12888.15 | 1757.26 |
| F.I.C.A. | 62 | 914.33 |
| GEORGIA | 48.53 | 668.14 |
| Medicare | 14.5 | 213.83 |
| Total Tax | 243.98 | 3551.56 |
| TAXES | | |
| SRC Medical EE | 19.21 | 304.63 |
| SRC Sidecuts | 7.6 | 121.6 |
| SRC Dental FAM | 27.64 | 359.52 |
| SRC Life Emp | 3.34 | 53.44 |
| SRC Denta Emp | 0 | 28.92 |
| Shoes for Crew | 0 | 39.48 |
| Total Deduction | 57.78 | 907.39 |
| NET | | |
| Total Net | 608.23 | 10268.28 |

Printed On
01/28/2004 at 16:54:45

BIOMETRIC MULTI-PURPOSE TERMINAL, PAYROLL AND WORK MANAGEMENT SYSTEM AND RELATED METHODS

CROSS-REFERENCE TO RELATED APPLICATIONS

This patent application is a continuation-in-part patent application of U.S. non-provisional patent application Ser. No. 10/183,767, filed on Jun. 27, 2002, now U.S. Pat. No. 6,764,013, which in turn is a non-provisional patent application of provisional patent application Ser. No. 60/372,983, filed on Apr. 17, 2002, the rights of priority of which are claimed for this patent application.

BACKGROUND OF THE INVENTION

This invention relates in general to a biometric multi-purpose terminal, payroll and work management system and related methods, and more particularly, to a biometric multi-purpose terminal that employees may use after authentication with a bankcard and personal identification number (PIN) and/or with a biometric device, such as a finger print detector to check-in and check-out of work, to receive new work instructions or assignments, to review payroll details, to print a payroll stub, to execute financial transactions, to print a receipt of a financial transaction or to request a payroll advance based upon work hours accrued, to wire transfer funds from a bankcard to another bankcard or bank account, to relay alerts and messages from the work location to back office systems and operational managers, or to order and track equipment at work locations. The invention also relates to systems and methods that utilize such biometric multi-purpose terminals, including deposit of net pay in a bank account associated with each employee's bankcard so that the pay is immediately accessible by each employee.

Automated teller machines (ATMs) are typically owned by banks or banking networks. They are widely available and are frequently used to dispense cash. A customer inserts or slides a bankcard in the ATM so that a coded account number can be read from the bankcard. Through a financial network, such as Visa™/Plus™ or Mastercard™/Cirrus™, the ATM then communicates with the bank that issued the bankcard (the issuing bank) to see if the desired cash withdrawal exceeds the current balance in a bank account that is related to the account number. If not, the cash is dispensed and the card owner's account is debited in the amount of the withdrawal plus any service charge for use of the ATM.

The user of the bankcard is also provided with a personal identification number (PIN) or password that is associated with the account number. The PIN is entered at the request of the ATM prior to authenticating both the account number and the PIN. In the event that the bankcard is lost, the finder will not be able to withdraw funds since he/she lacks the PIN necessary to complete any ATM transaction.

ATMs provide a variety of account transactions. The user may withdraw cash from user's checking account, savings account or as an advance from a line of credit, such as a credit card account. The user may also transfer funds between accounts, such as from a checking account to a savings account. In some instances, the user may ascertain the balances in accounts associated with the account number. However, the principal use of ATMs continues to be cash withdrawal.

Local check cashing, payday loan and wire transfer service providers, also referred to as alternative financial service providers, compete with banks and the ATMs by providing financial services for their profiled customers. Profiled customers have previously signed a signature card or have otherwise previously confirmed their identity with a local alternative financial service provider, or with a network of such alternative financial service providers. Alternative financial service providers tend to operate locally, instead of in nationwide like the banking networks. The alternative financial service providers compete with banks and ATMs by cashing checks, particularly payroll checks, for its pro-filed customers. A typical fee for such a transaction is about 1.6 percent of the amount of the payroll check. For higher volume transactions, the income from check cashing can be quite substantial.

The customers of alternative financial service providers are typically lower-wage local residents who do not have checking or savings accounts at a local bank, and therefore rely on an alternative financial service provider to convert their paychecks into cash. Since they do not have a bank account, they do not have a bankcard and cannot use an ATM. There is therefore a business opportunity for banks to acquire new customers by providing the functions performed by alternative financial service providers in cashing payroll checks and money orders.

Wire transfer of funds is another function typically performed by one bank to another bank. This function is not normally available at alternative financial service providers. As a result, those individuals who use alternative financial service providers for their financial affairs often use a company that specializes in wire transfers, such as Western Union or American Express Company. The fees for providing wire transfer service at these companies are generally around 4 to 6.5 percent, depending upon the amount transferred. For example, a typical current fee for wire transferring a minimum of $200.00 is about $13.00. These fees are graduated upwardly for larger wire transfers; such as to about $200.00 in fees to wire transfer $5,000.00.

Many of the afore-mentioned lower-wage earners send money to their relatives in the United States or abroad. Among the other more significant users of wire transfers are travelers and the parents of college students because immediate access to funds is often desired or needed. Thus, if wire transfers could be accomplished relatively inexpensively, additional customers could be obtained who are likely to also use the other available financial services. This presents yet another business opportunity.

Many such lower-wage earners also visit the alternative financial service provider to ask for a short term loan advance, which they usually pay off by the next payday. Such short term loans, also referred to as a "Payday Loan" advance, are sometimes at predatory interest rates ranging from 1 to 1.5 percent per day. This interest rate translates to and annual percentage rate of 365 to 520 percent, or more depending upon the compounding of the interest.

Larger employers usually develop or purchase a payroll system. Often, the payroll system is part of a larger computer system that records many different types of business transactions. These payroll systems are quite complex since they must deal not only with time and attendance, but also with a plethora of potential deductions. Deductions generally include federal income tax, FICA, state income tax, in some instances county, township or city tax, health insurance, dental insurance, contributions to retirement plans, contributions to profitability or stock purchase plans, union dues, alimony and the like. For businesses with employees in more than one state, the complexity is usually compounded by differences in the state and local tax laws.

However, the real inefficiency in payroll systems is in keeping track of the time of hourly employees. Customarily, timesheets are collected, the payroll is processed and payroll checks are cut and distributed to the employees. Payroll is often centralized for employers with more than one location. This means that timesheets are express mailed to where the payroll is processed, such as at the corporate headquarters. The payroll checks must then be issued and express mailed back to all of the employee locations. This process is expensive, cumbersome and time consuming. Thus, payroll cannot practically or economically be done on a daily basis is such systems. Most employers therefore pay their employees once every two weeks, or once a month.

Employee turnover is another significant expense. The payroll database must frequently be updated to add new employees and to delete former employees, including all pertinent employee information. The hiring process to attract and bring in new employees to replace departing employees is particularly expensive.

On the other hand, employers can increase employee loyalty and reduce such payroll and hiring expenses by paying wages more frequently, such as on a weekly basis, or even on a daily basis, and by providing payroll advances based upon the accrued pay at the time that the payroll advance is sought. Research indicates that lower-wage employees will frequently change jobs for as little as $0.25 per hour increase in wages. This is particularly a problem for employers in labor-intensive industries, such as janitorial services, hotel-motel service companies, fast food franchises and the like.

Research also indicates that many employees will actually work for somewhat less compensation than is available in the competitive marketplace if they are paid more frequently. This is because many employees operate from paycheck to paycheck, and some employees have difficulty surviving financially until the next paycheck. A more frequent paycheck is therefore of considerable value to such employees since it reduces the pay cycle. More frequent wage payment and payroll advances also operate as a disincentive for many employees to change employment to a different employer with longer wage payment intervals.

Research also indicates that many employees would feel more loyal to their employees if their employers offered short term loans which would be paid back by the next payday. This means that low wage employers offering payday loan advances, at a discount compared to the prevailing rates charged by alternative financial service providers, could increase their employee retention rates. That is, such employers could enjoy less employee turn over.

Another problem with prior art payroll systems is fraud resulting from buddy punching. This is where an employee who may be late, leaves early, or will be absent on a particular day has a buddy or friend punch his/her timecard in and/or out. Such fraud remains a significant problem in many labor-intensive industries where large numbers of employees check-in and checkout each workday. Various biometric systems that verify the identity of the person by his or her physical characteristics, such as the retina of the eye or a fingerprint, have been proposed and implemented. If an employee is sensitive about checking in and checking out through biometric devices, such as a fingerprint reader, he/she may use the bankcard reader instead.

Many lower-wage employees, such as those that clean commercial buildings and/or private property, perform their work after normal business hours. Thus, if an owner or manager of the property wants to change the work to be performed, he/she has to stay late, leave written instructions, or call the manager of the cleaning services. Even if the employee receives the work changes, the employee may not be able to perform the work because of union rules, the scope of the work services contract or the like. In addition, the desired work change may involve a different type of work that is compensated at a different pay rate. The property manager may have to contact the supervisor of the employee to renegotiate the contract, and then try to contact and inform the employee. These cumbersome and time consuming approaches could be avoided if the employee's supervisor and/or the property manager had a better way to communicate the new work instructions or assignment to the employee, such as by the employee receiving the instructions or assignment upon checking in to work.

Quality inspectors routinely do inspection of the work performed at different property sites. These audits are typically reported by paper or electronically, as by computer or hand-held device. Thus, the inspector usually sends the quality report to a remote location by faxing a paper report or by using a modem to link to a database. The process of sending the report could be made more efficient if the inspector could use the same electronic terminal to send the quality report that the employee uses to check into or out of work.

Even if the employees are paid electronically by deposit to a known bank account number, laws in most jurisdictions require that the employer provide a copy of the payroll stub to the employee that lists at least the gross pay, the deductions and the net pay. Supervisors, payroll administrators and human relations personnel frequently receive inquiries about the payroll stub, particularly where different job assignments have different pay rates. The ability to print out a detailed payroll stub, such as at the same electronic terminal that the employee uses to check into or out of work, including the different pay rates for the different types of work would be highly effective in reducing these time-consuming inquiries.

Most commercial biometric clocks give only test feedback when an employee punches in or punches out. Thus, if a user's fingerprint is not matched, the system displays a text message telling the user that access was denied, or emits an audible tone, such as a high pitch buzzing sound, that can be annoying.

Accordingly, there has been a long felt need for an improved payroll and work management system that includes multi-purpose terminals with biometric confirmation of the employee's identity. Furthermore, there has been a long felt need for incorporating numerous functions into such a biometric multi-purpose terminal, such as checking in and out of work, receiving work instructions and assignments at the terminal, printing universal payroll stubs at the terminal, executing financial transactions, requesting and obtaining payroll loan advances, receiving work quality audits, relaying alerts and messages from the work locations, ordering and tracking equipment at the work location, depositing pay in a bank account associated with the employee's bankcard so that the pay is immediately accessible, alerting that key employees or an insufficient number of employees have not punched in for work, and alerting management employees of any work-related injuries or unforeseen incidents.

A general object of the present invention is therefore to provide a system that offers hourly workers a turnkey financial, communication, e-commerce, payroll and work management solution that is economically beneficial for them as well as for their employers.

Another object of the present invention to provide an electronic payroll system and methods therefor wherein an electronic terminal reads biometric information that uniquely identifies the employee and which is then communicated to a computer for authentication.

A further object or the present invention is to minimize the payroll fraud resulting from buddy punching through the use of a biometric multi-purpose terminal to read biometric information for authentication.

Yet another object of the present invention is to use the APW device as a field alert system to alert managers when key employees have not punched in for work as scheduled, or when the number of employees punching in at a work site is below a certain minimum.

Still another object of the present invention is to provide an APW device with an incident reporting system, such as when an employee has a work related injury or when an unforeseen incident occurs at the work site.

A still further object of the present invention is to provide an APW device that functions as a biometric financial terminal to enable employees to request a payday loan advance based upon accrued hours worked and to receive the payday loan funds credited to their bankcards.

Another object of the present invention is to provide an APW device that functions as a biometric financial terminal to provide employees with the capability of transferring funds from their bankcard to a secondary bankcard or to another bankcard.

Yet another object of the present invention is to provide an APW device that can operate as a universal payroll stub printer, including for remotely based employees, in conformance with the American Payroll Association (APA) payroll stub format, and regardless of the payroll headers or fields needed or required.

Another object of the present invention is to use the bankcard and PIN and/or a biometric detector, such as a fingerprint detector and comparator, as work attendance devices by using the times of authentication as work check-in and work checkout times.

A further object of the present invention is to eliminate the inefficiencies in issuing and distributing payroll checks to employees by periodically crediting net pay to a bank account associated with the bankcard that is also used to check-in and check-out of work and by enabling the employees to print their paycheck stub at the electronic terminal, or at any supported ATM terminal.

Yet another object of the invention is to provide two-way messaging relating to work assignments, including acceptance of work assignments at check-in and confirmation that work assignments have been completed at checkout at the electronic terminal.

Another object of the present invention is to provide alerts from an APW device, especially to managers, such as when an insufficient number of employees check in, when budgets may be exceeded or when security issues arise.

SUMMARY OF THE INVENTION

The present invention includes a biometric multi-purpose electronic terminal, a payroll and work management system and related methods. The terminal and system provide ATM, payroll and work management (APW) functions. Such functions include recording employee attendance and work hours, providing work instructions and assignments to the employees, periodically calculating the payroll and depositing payroll funds into each employee's account for immediate access by the employees, permitting each employee to review his/her payroll including gross pay, deductions and net pay, printing an employee's payroll stub, enabling employees to review and execute financial transactions and receiving and displaying the results of work quality audits. The system also includes the ability to request a payday advance or loan against the hours worked, and the pay accrued, up to that point in time. The amount of pay that has accrued is determined at the time of the payday advance request, and the employee is permitted to access all or any portion of the accrued pay. A service fee may be imposed for providing the payday advance.

Access to the system is permitted after authentication by a biometric device, such as a fingerprint reader, or by a bankcard and a personal identification number (PIN). In an initial registration process, the electronic terminal gathers biometric information, such as a fingerprint, which is then stored at the electronic terminal or in memory of the APW system for future comparison purposes. Each bankcard is related to a separate bank account and the employer deposits each employee's net pay in the respective bank accounts associated with each bankcard. The employee can then use the bankcard to withdraw cash from any supported ATM station or to pay for transactions at any point of sale (POS) device.

Each employee is provided with a bankcard encoded with a unique identifying account number and a personal identification number (PIN). The bankcard may be either the magnetic stripe type or the smartcard type. One or more electronic terminals are located at the employer's work site to read the account number and to request entry of the user's PIN. The biometric device is used for work attendance in place of a conventional time card and/or timesheet. Alternatively, an employee may use his/her bankcard and PIN for authentication during punch in and punch out. Biometric information from the biometric device, or the account number and PIN, is communicated from the electronic terminal to a computer, which may be an array of servers or any other suitable computer, computer system or data processing system. The servers have the employee names, pay rates, biometric information for each employee, the unique identifying account number and the PIN for each employee stored in memory. The servers then compare the received biometric information, or the account number and PIN, with biometric information, account numbers and PINs previously stored in memory to authenticate the received information and to use the current time as a payroll check-in or checkout time for that employee upon authentication.

The APW system periodically uses the check-in and checkout times to calculate the payroll, to authorize the transfer of funds sufficient to cover the total amount of the payroll to the bank that issued the bankcards, and directs the bank to credit the bankcards for each employee in the amount of the calculated pay for each employee. Typically, the determination of the payroll can be done on a daily basis, if so desired. However, when a payday advance is requested, the payroll system can instantaneously determine the accrued pay up to the time of the advance was requested by employee. The employees may then request a payroll advance, which triggers the system to calculate a payday loan advance amount up to or equaling an amount obtained by multiplying the accrued hours worked by the employee's hourly pay rate, then discounted by a risk factor. The employee is then prompted with the maximum payday loan advance amount available. The employee then enters the loan amount which he/she is requesting, not to exceed the available credit line presented by the APW system. The requested payday loan advance is then electronically credited to the employee's bank card. The employee can then withdraw the deposited funds from an ATM, use the bankcard to pay for purchases or to transfer available funds to another account. The employee may also view his/her payroll information, and print out a payroll stub.

Authorized users may enter work assignments or instructions into the APW system, such as through a dedicated call center or by secured access to the system. Upon authentication of the employee at the electronic terminal, the employee is presented with a greeting. If the employee's work is subject to change, the terminal may display a set of new work assignments or instructions. To the extent that the rate of pay differs for different assignments, a breakdown of the pay for each work assignment may also be displayed. Appropriate incentives may be provided such as increased pay for certain assignments or for overtime work to motivate the employee to accept the assignments. The employee may obtain a print out of the work assignments from the terminal.

The system also provides two-way messaging relating to work assignments. For example, the system may request confirmation that mandatory work assignments were completed at the time of checkout, and that elective work assignments were completed if agreed to at check-in. This significantly assists in the management of the work and provides greater flexibility in managing the work force to assure that needed tasks are satisfactorily completed. It further provides for more efficient utilization of the work force.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures in which like reference numerals identify like elements, and in which:

FIG. 5 is another simplified block diagram, similar to FIG. 4, illustrating another embodiment in which the employer's bank is also the card-issuing bank.

FIGS. 20A–20H illustrate the typical screens used on the display of the electronic terminal of FIG. 1 for a supervisor to approve of, or to edit, the missed punch-in information that was entered by the employee.

FIGS. 25A–25D illustrate the typical screens used on the display of the electronic terminal of FIG. 1 by an employee to obtain a payroll advance against currently accrued pay.

FIG. 30 is a flow chart providing details of printing a payroll stub from an electronic terminal.

DETAILED DESCRIPTION OF THE INVENTION

Figure 1:
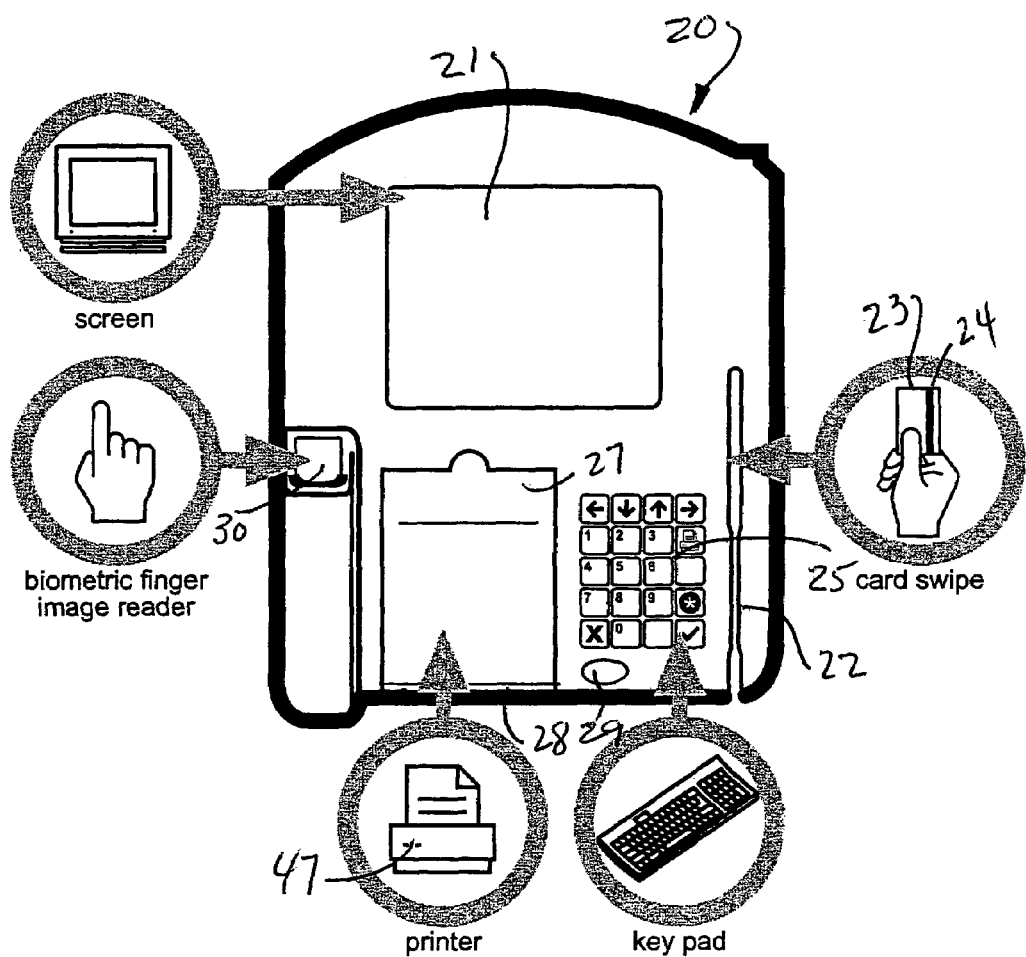
FIG. 1 is a front diagrammatic view of the preferred embodiment of an electronic terminal, with a biometric device suited for reading biometric information from an employee, and that provides a plurality of functions in accordance with the present invention.

Referring to the Figures, and particularly to FIG. 1, a preferred embodiment of an electronic terminal, generally designated 20, is constructed in accordance with the present invention. Preferably, electronic terminal 20 has ATM, payroll and work management (APW) capability, and may hereinafter also be referred to as an APW terminal 20. Disposed near an upper end of APW terminal 20 is a display screen 21 for displaying information, options, commands, work assignments, messages or the like. Display 21 may be of the liquid crystal display (LCD) type for displaying a plurality of different screens of information, as will be presented in greater detail below. The APW terminals may be located wherever employees usually check-in or checkout of work, such as at the employer's facilities, or at the customer's facilities in those instances where the employees work at the customer's facilities, such as for example, janitorial or cleaning staff.

Terminal 20 is equipped with a card reader 38 (FIG. 3) disposed alongside a slot 22 for reading a bankcard 23, a keyboard or keypad 25, a display 21, a printer port 28 and a biometric device 30. Card reader 38 reads the information contained on a magnetic stripe 24 of the bankcard 23, such as a bank account number. For example, card 23 may be a bankcard issued by a bank and the magnetic stripe may have a unique identifying number encoded therein which corresponds to one or more accounts at said bank. Of course, APW terminal 20 could alternatively be equipped to read information from smartcards. Since bankcard 23 is also used in the APW terminal as an ATM, payroll and work management (APW) card, card 23 may hereinafter also be referred to as an APW card.

Keypad 25 contains a plurality of keys for entering numeric information, for scrolling through the information displayed on display 26, for accessing a prior page or the next page, for entering selected information, and the like. For example, in addition to the ten numerals 0–9, keyboard 25 may have four keys; one each for scrolling up, down, right and left. In addition, keyboard 25 may have a key with a period for separating dollar and cent amounts, a key with circular indicia for starting desired functions such as reading a fingerprint on biometric device 30, a key with a printer symbol for printing the current screen appearing on display 21, a star button to continue a desired function, a key with a check mark for approving or responding to specific inquiries or options and a key with an "X" indicia for exiting the present function or for deleting information entered into terminal 20. Examples of the use of the various keys of keyboard 25 will be explained in greater detail below with respect to initiating and executing specific functions that are provided by terminal 20.

Printer port 28 has a printer 47 (FIG. 3) disposed behind an access door 27 and provision for containing a source of paper, such as a roll of paper, behind the access door. When the terminal 20 is instructed to print, the printed paper from a roll is dispensed through the printer port 28 such that the user may tear it off against the forward edge of the port. For example, an authenticated employee may obtain a print-out of a payroll stub relating to the most recent pay period including details about gross pay, deductions and net pay. Other types of printed information from APW terminal 20 may include current work assignments and/or locations, recent activity and balances in bank accounts related to the unique number of the bankcard, and the like. The results of work quality audits may also be made available for printing.

Terminal 20 also preferably includes a biometric device 30, such as a fingerprint reader and comparator (hereinafter fingerprint reader). Due to the unique characteristics of human fingerprints, the fingerprint reader 30 may be used as the preferred form of employee identification, or to supplement the card reader 22 in its reading of the bankcard 23. For example, one of the frequently encountered problems of using the terminal 20 of FIGS. 1–5 is that the employee may forget or lose their bankcard and then be unable to check-in or checkout of work on the terminal 20 if only bankcard access to terminal 20 is permitted. However, with a biometric device 30 provided on terminal 20, the employee will be able to check-in or checkout by applying their finger against the fingerprint reader even if their bankcard is not available at the time of check-in or checkout. This form of identification also provides excellent immunity to the buddy punching problem.

An infrared communications port 29 may be provided, as along the bottom edge of APW terminal 20 in the embodiment shown in FIG. 1, to communicate with other devices that also utilize infrared communication means. For example, a supervisor of employees or a customer of employment services may enter information about new work assignments, or may provide information about previous work assignments that were not completed or that were unsatisfactorily completed. The supervisor or customer may also enter the new work assignments or the feedback on prior work assignments on a portable or laptop personal computer (PC) or a personal digital assistant (PDA) that is also equipped with an infrared communications port. Such information may then be received by the APW terminal and communicated to a computer for processing, storage and/or later retrieval.

Figure 2A:
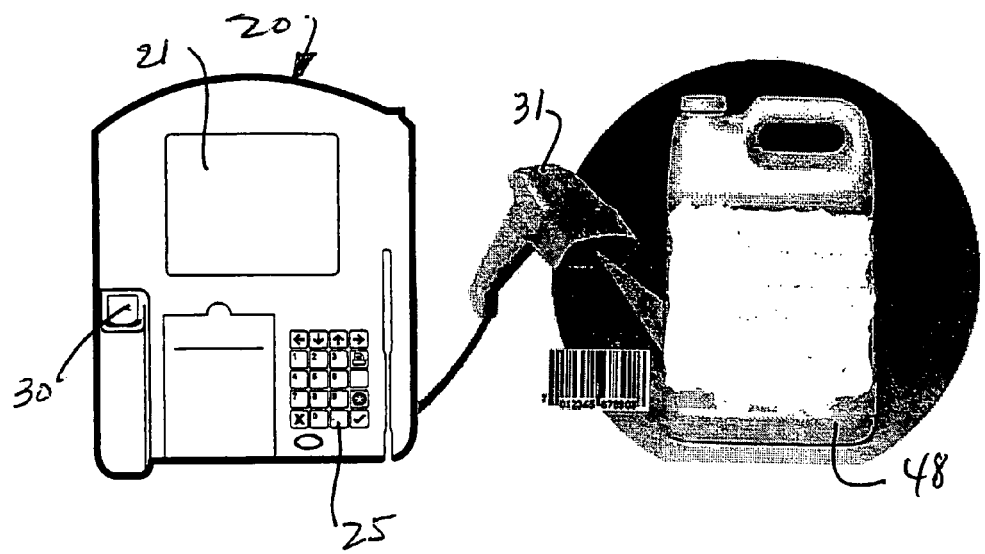
FIG. 2A is a diagrammatic view of the electronic terminal illustrated in FIG. 1 in combination with a bar code scanner to monitor an inventory of supplies at a job site.
Figure 2B:
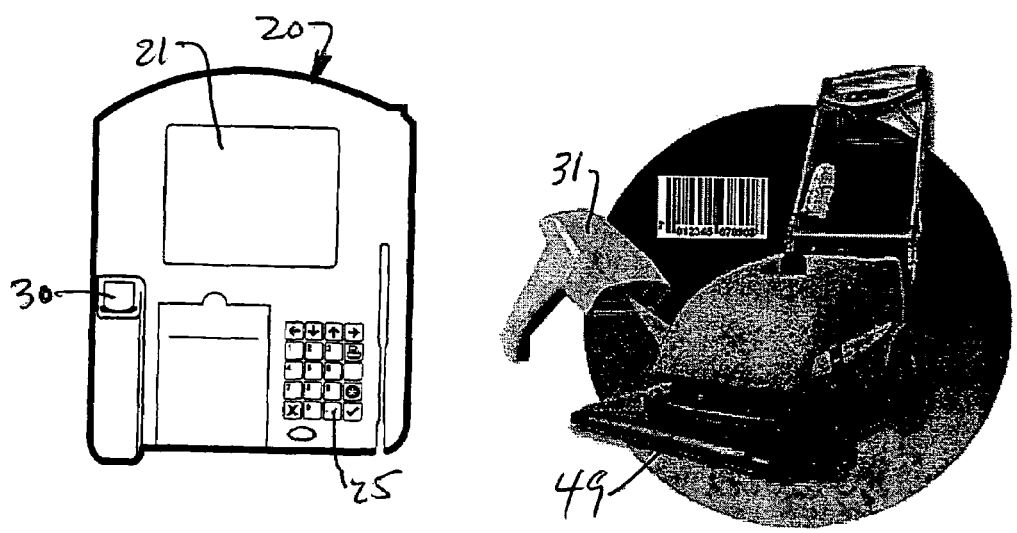
FIG. 2B is a diagrammatic view of the electronic terminal illustrated in FIG. 1 in combination with a wireless bar code scanner to monitor or track equipment at a job site.

As shown in FIG. 2A, terminal 20 may be equipped with a bar code reader 31, which may be used to read the bar codes on supplies, such as a container 48 of cleaning fluid or the like. Thus, the inventory of supplies may be tracked. Likewise, the bar code reader 31 may be used for convenient ordering or replenishing of supplies. In FIG. 2B, bar code reader 31 is of the wireless type and may be used for monitoring the usage of equipment, such as the floor cleaner 49, or for tracking such equipment.

Figure 3:
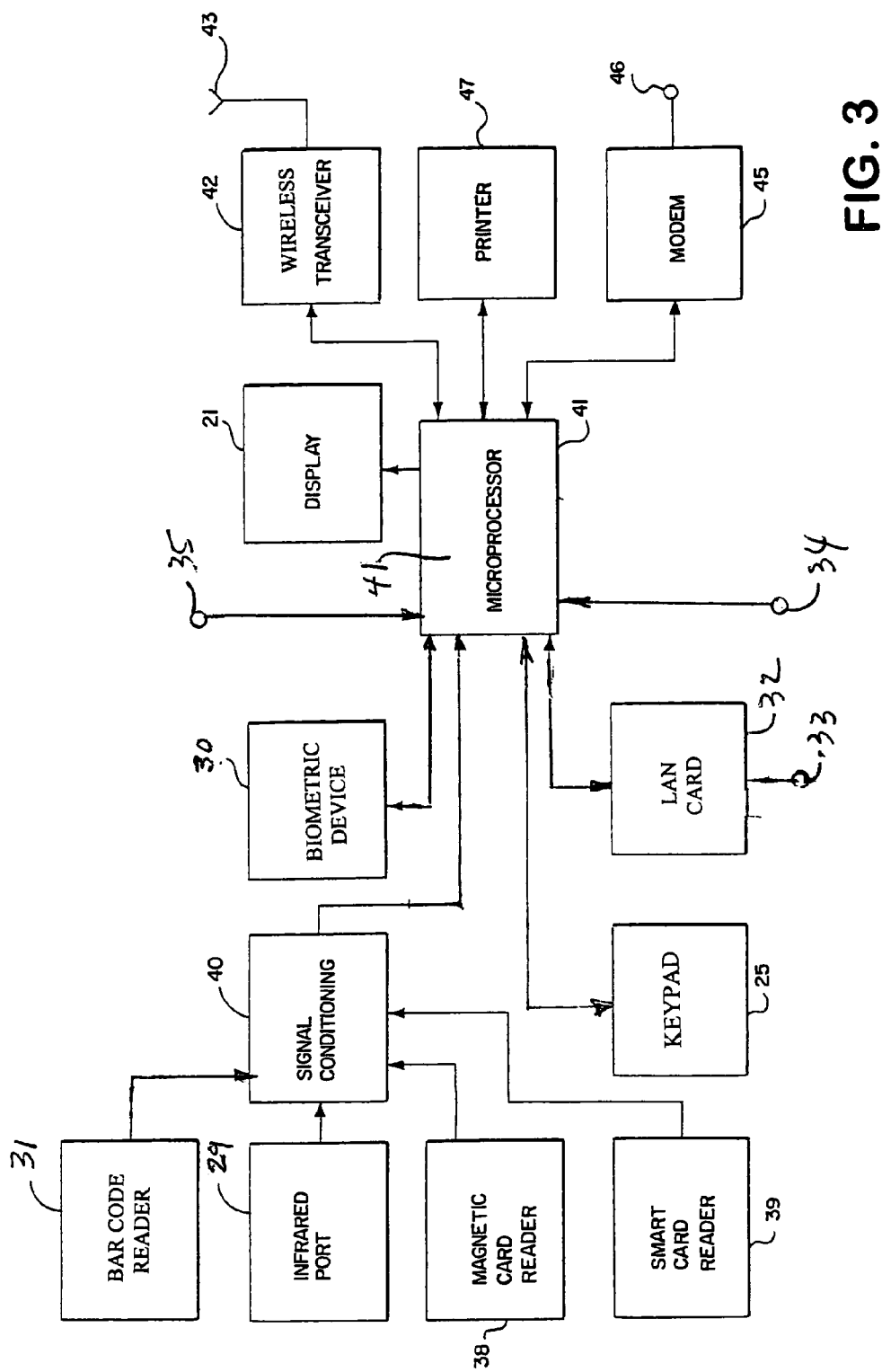
FIG. 3 is a block diagram of the internal structure and functionality of the electronic terminal illustrated in FIGS. 1 and 2A–2B.

The internal structure and functionality of APW terminal 20 is illustrated in FIG. 3. As previously described, APW terminal 20 has a magnetic card reader 38 disposed in the card slot 22 to read encoded information from the magnetic stripe 24 disposed on the bankcard 23. Terminal 20 may also be provided with a smartcard reader 39 to read information from a smartcard. As also previously described, terminal 20 has an infrared port 29 to communicate with other devices having infrared ports, such as PCs and PDAs. Information signals from the magnetic card reader 38, the smartcard reader 39, bar code reader 31 and the infrared port 35 are preferably conditioned by signal conditioning circuitry 40 to provide input signals that are compatible with input terminals of a microprocessor 41. The biometric device 30 may interface directly with microprocessor 41. A LAN card 32 also interfaces with microprocessor 41 to provide further connectivity in the APW system 50 via and I/O port 33. Microprocessor 41 also receives inputs from the keypad 25. Microprocessor 41 may be any suitable microprocessor, microcontroller, data processor or the like.

Any of the information provided to APW terminal 20 may be communicated to a computer or database, which may be remotely located. To this end, microprocessor 41 may supply input information to a radio frequency (RF) transceiver 42 for transmission via an antenna 43. The path of RF transmission may be by conventional antenna-to-antenna RF transmission, a microwave link, a satellite link, or the like. Terminal 20 also receives information from a remotely located computer or database via RF transmission in the reverse direction, such as from antenna 43 to RF transceiver 42 to microprocessor 41. Typically, microprocessor 41 will provide some of the received information for display on the display screen 21.

The microprocessor 41 in terminal 20 preferably has sufficient dedicated memory, either internally or externally, to store the unique account numbers of the bankcards and the PINs of the employees that frequently use any particular terminal 20. Authentication of those employees may then be done internally at terminal 20 without having to communicate with a remote computer to access the appropriate account numbers and PINs. However, in such instances, terminal 20 continues to communicate with a remote computer or database to provide the check-in and checkout times for processing of the payroll.

Terminal 20 may also communicate, separately or in tandem with the RF link, via a modem 45. Modem 45 has an output terminal or jack 46 to communicate bidirectionally with a remotely located computer or database either by means of the public switched telephone network (PSTN), by means of the internet, or the like.

An internal printer 47 may be activated by the printer key on keypad 25 (FIG. 9B) to print information on display screen 21. The printed copy is provided through printer slot 28. Printer 47 may be of the thermal paper type or any other suitable type.

Figure 4:
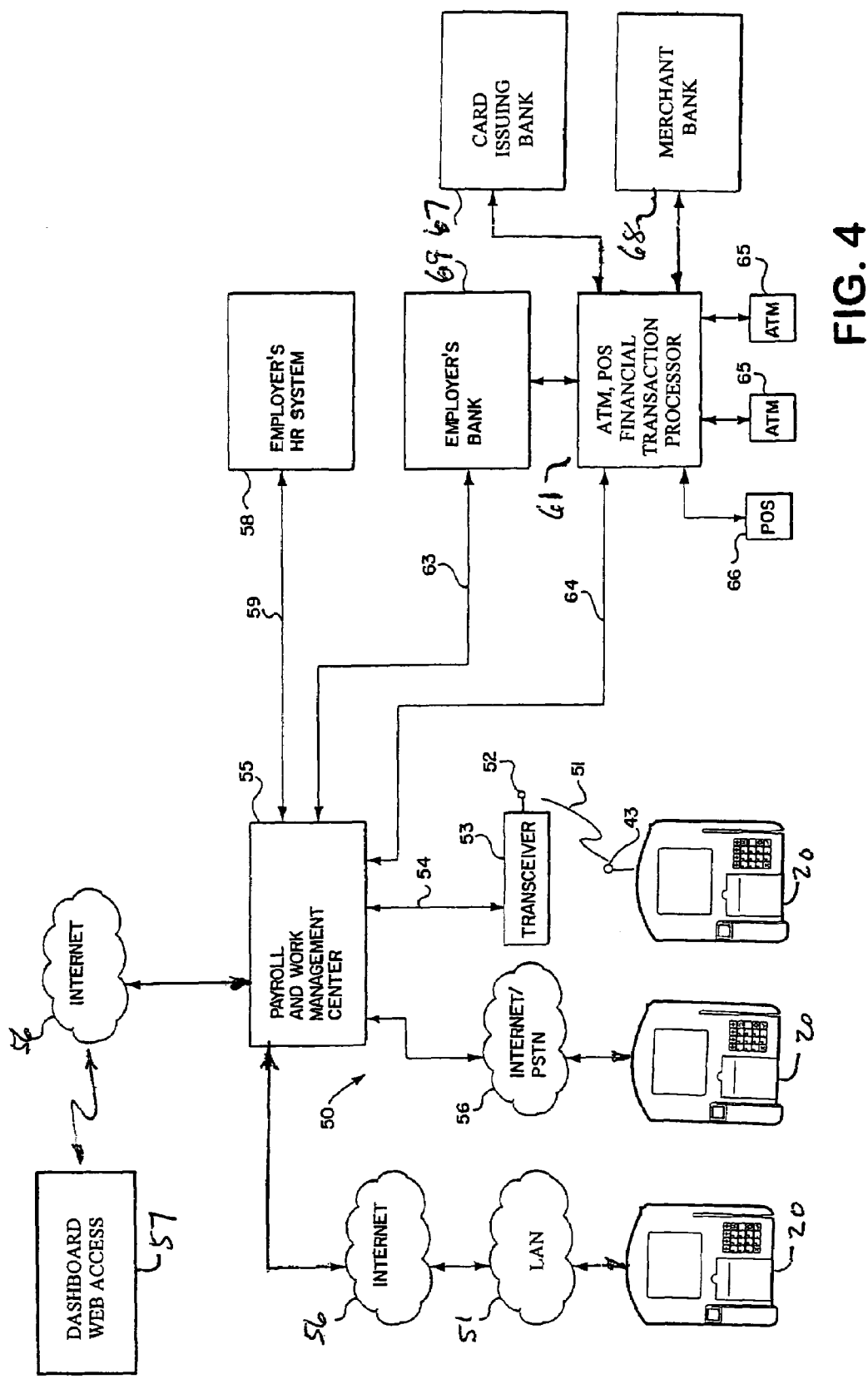
FIG. 4 is a simplified block diagram illustrating one embodiment of the present invention in which payroll funds are credited from an account in the employer's bank to the employee's bankcard account for access at an ATM or a point of sale terminal.

With reference to FIG. 4, there is shown an ATM, payroll and work management (APW) system in accordance with the invention, generally designated 50. One or more APW terminals 20 are included in the APW system 50. One of the terminals 20 is shown with an antenna 43 to transmit radio waves to the antenna 52 of a transceiver 53, which in turn communicates with a payroll and work management center 55 via one or more lines 54. While antennas 43 and 52 of terminal 20 and transceiver 53, respectively, are shown as external for purposes of the illustration in FIG. 5, it will be appreciated that these antennas 43 and 52 could be internally disposed within the respective terminals. The other terminal 20 is shown communicating with center 55 via the internet or the PSTN 56. Yet another terminal 20 communicates with center 55 via a LAN 51 and the internet 56.

The payroll and work management center 55 has a computer with memory for storing the names of employees, the pay rate for each employee, any deductions from pay for health insurance or the like, the number of the unique bankcard that has been assigned to each employee and the PIN associated with each bankcard. Payroll and work management center 55 may have additional pertinent information concerning each employee, such as a mailing address and a home telephone number. Center 55 previously received such information from the employer's human relations (HR) system 58 via a communication line 59. From time to time as new employees are hired, or when the status of an employee changes, employer's HR system 58 provides updated employee information to the payroll and work management center 55. Dashboard web access 57 enables real-time monitoring of the status the APW system, including information on employees that are registered on the system, the number of employees that have checked into work at any particular site, and the like.

Center 55 also records the time of check-in and the time of checkout for each employee to determine the amount of work time. The pay for each employee is calculated based upon the recorded work time and the pay rate for each employee. These calculations may occur as frequently as directed by the employer, such as each day or each week. Payroll and work management center 55 then advises the employer of the amount of the payroll. Center 55 then performs an electronic funds transfer (EFT) from employer's bank in the amount of the payroll so that each employee's bank account associated with each APW card will be credited in the net amount of pay for that pay period.

Payroll and work management center 55 may advise employer's HR system 58 on line 59, employer's bank 61 on line 63 and/or the ATM, POS financial transaction processor 61 on line 64 of the break-down of the payroll. Each employee with earnings in the respective pay period will have his/her account associated with the bankcard credited with the appropriate amount of net pay. Thereafter, the employee may access his/her available funds, such as by making cash withdrawals at an ATM 65. The APW card may also be used as a debit card against available funds at any point of sale (POS) 66, such as at department stores, grocery stores, gas stations or the like.

FIG. 5 illustrates a payroll and work management system, generally designated 60, similar to the system 50 illustrated in FIG. 4. However, in the system 60, there is no intermediate bank, such as employer's bank 69 in FIG. 5. Otherwise, the operation of the system 60 is generally similar to the already described operation of system 50.

Figure 6A:
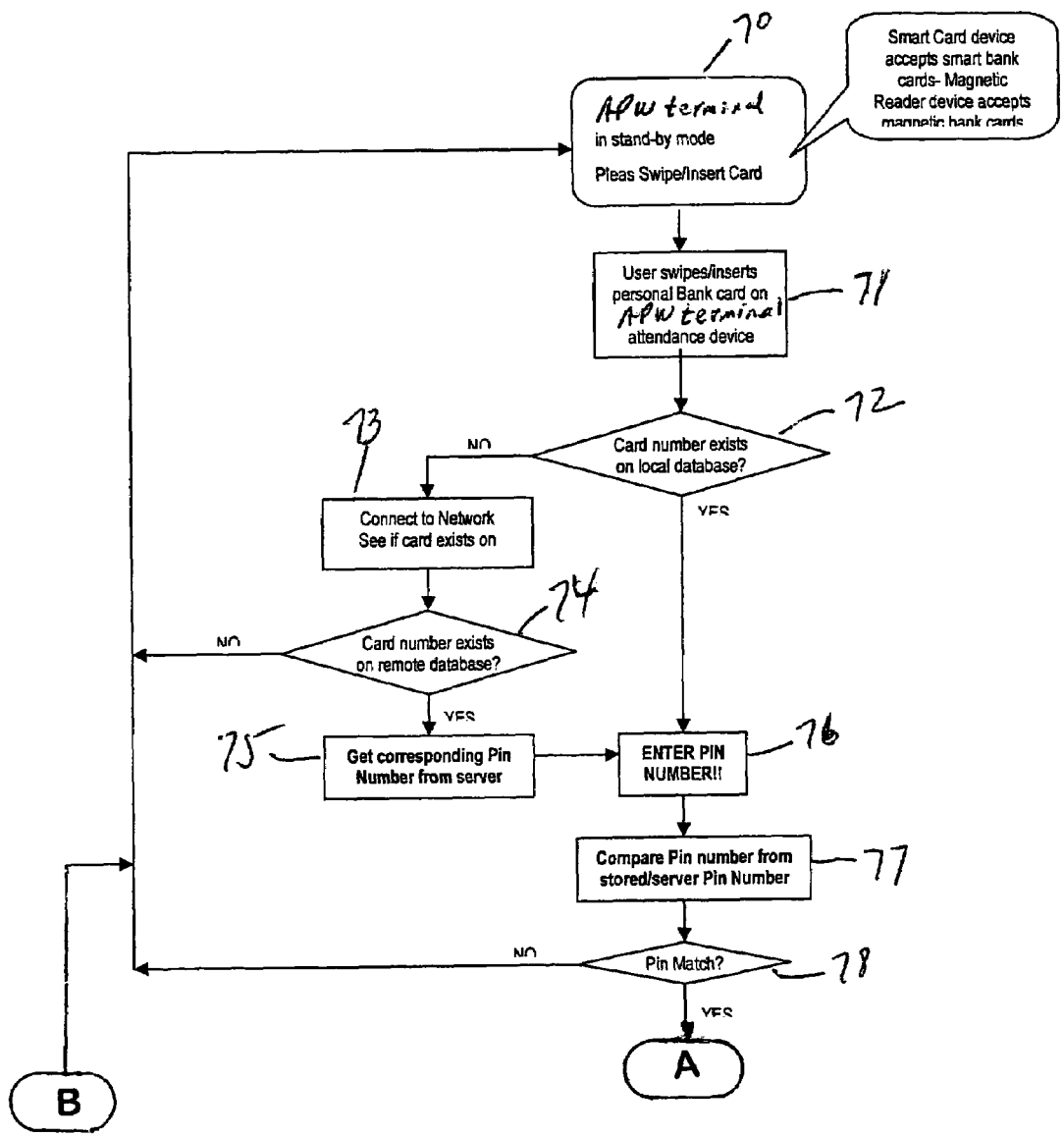
FIGS. 6A and 6B are a flowchart illustrating the steps employed by the electronic terminal and a computer to authenticate a bankcard number and PIN including the various options available after authentication, such as checking-in or checking-out of work on the electronic terminal illustrated in FIGS. 1–5.
Figure 6B:
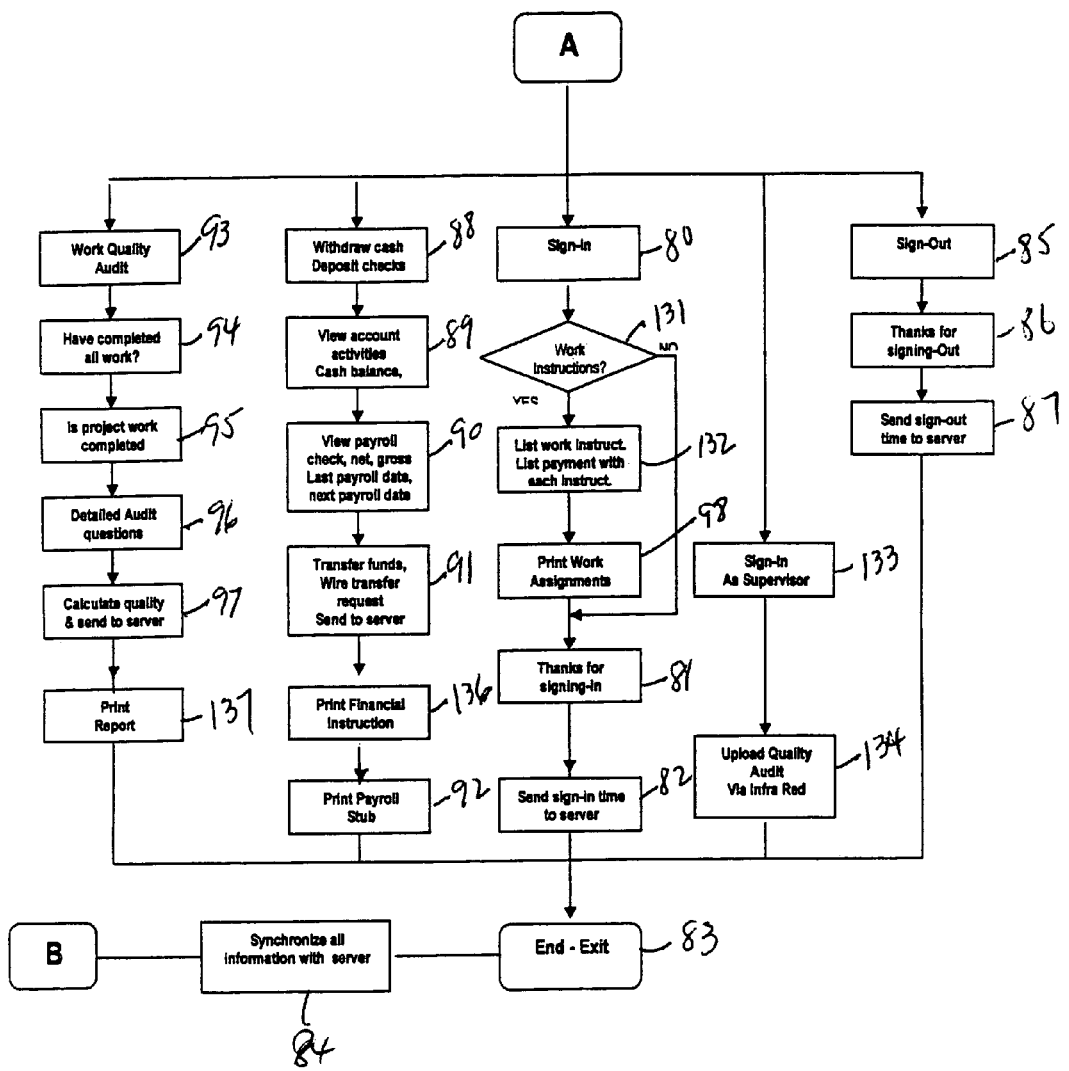

FIGS. 6A and 6B are flowcharts of the functions and communications between one or more APW terminals 20 and the payroll and work management center 55. As seen in block 70, the APW terminal 20 is initially in a stand-by mode and display 21 may display a request, such as "Please Swipe or Insert Card" or use the biometric reader 30. When the user swipes or inserts his/her card or enters a fingerprint on the fingerprint reader 30, the unique account number is read and transmitted, or the fingerprint data is read and transmitted, to the payroll and work management center 55, as indicated in block 71. Center 55 then searches to see if the card number or fingerprint data exists on its local database as shown in decision block 72. If not, center 55 may poll a remote network or database, such as that existing at the employer (block 73). If the card number or fingerprint data exists on a remote database, block 74, the center 55 will also obtain the corresponding PIN from the remote database, block 75. If the card number and PIN or fingerprint data are not available on remote databases, the APW terminal 20 will return to the stand-by mode in block 70.

Assuming that the card number and PIN are available on the local or remote databases, APW terminal 20 requests that the employee enter the PIN at block 76. The entered PIN is then compared to the stored PIN information in block 77. If there is no match, decision block 78 returns the APW terminal 20 to the stand-by mode; block 70. If there is a PIN match at block 78, the authentication procedure is successfully completed and the employee continues to the various options shown in FIG. 6B. The process for handling fingerprint images is described in further detail in FIGS. 9A–9G.

Upon completing authentication, the employee may be presented with four options on the display screen 21, such as sign-in, sign-out, financial transactions and work related functions. The employee then uses the navigation keys to scroll to one of the desired functions displayed on screen 21, or enters the number of the desired option on keypad 25. If sign-in is selected, terminal 20 acknowledges that the employee has signed in at block 80 in FIG. 6B. Block 131 determines if any work assignments or instructions were previously entered for this employee. If so, the work assignments and/or instructions are presented on the display 21 of terminal 20 as indicated at block 132. Since there may be differences in pay for different types of work, the different pay rates are also displayed. The employee may then print out the assignments, instructions and pay rates from the terminal 20. The time of sign-in is then sent to the computer at the payroll center, as indicated in block 82. Alternatively, the computer may simply receive the sign-in information and set the time of sign-in by using its own clock. The APW terminal 20 then exits via block 83, synchronizes its data with that of the computer as shown in block 84 and returns to the stand-by block 70.

If the employee elects to sign-out of work after authentication, as at block 85, the terminal 20 thanks the employee for signing out, as at block 86. The computer then stores the time of sign-out. The computer can then determine the amount of time worked by determining the amount of time between the times of signing in and signing out.

If the employee selects a financial transaction after the authentication procedure, several choices such as shown in blocks 88–92 in FIG. 6B may appear. If APW terminal 20 is equipped for cash transactions, the employee may withdraw cash or deposit money into the bank account associated with the account number encoded on the APW card, as at block 88. If the choice illustrated in block 89 is selected, the employee may see the current balance in the bank account and may review recent account activities, such as within the last month. The employee may also view the last payroll payment credited into his/her account, the gross pay, the deductions from gross pay, the next payroll date, and so forth, as shown in block 90. The employee may also print this information by selecting the print payroll stub option at block 92. The employee may select to transfer funds to another account, such as a checking account, or to request a wire transfer as shown in block 91.

The employee may also select work related functions after authentication of the bankcard and PIN. Blocks 93–97 are reserved for a supervisor or customer to enter information about the performance of the employee that may affect the amount of pay. The employee may view this information, but not make new entries or change the existing information. However, if the employee frequently receives new work assignments, he/she may view the new work assignments or the new work location, as shown in block 98. The new assignments may also be printed out at APW terminal 20, as shown at block 98.

A supervisor or customer may also sign in at terminal 20 as indicated at block 133. A work quality audit may then be uploaded at the infrared port 35 of terminal 20 as previously described, and as indicated at block 134. This is the report that the employee may view at blocks 93–96. The quality audit may result in adjustments to the employee's pay in accordance with prior arrangements or understandings between the employer and employee.

Figure 7:
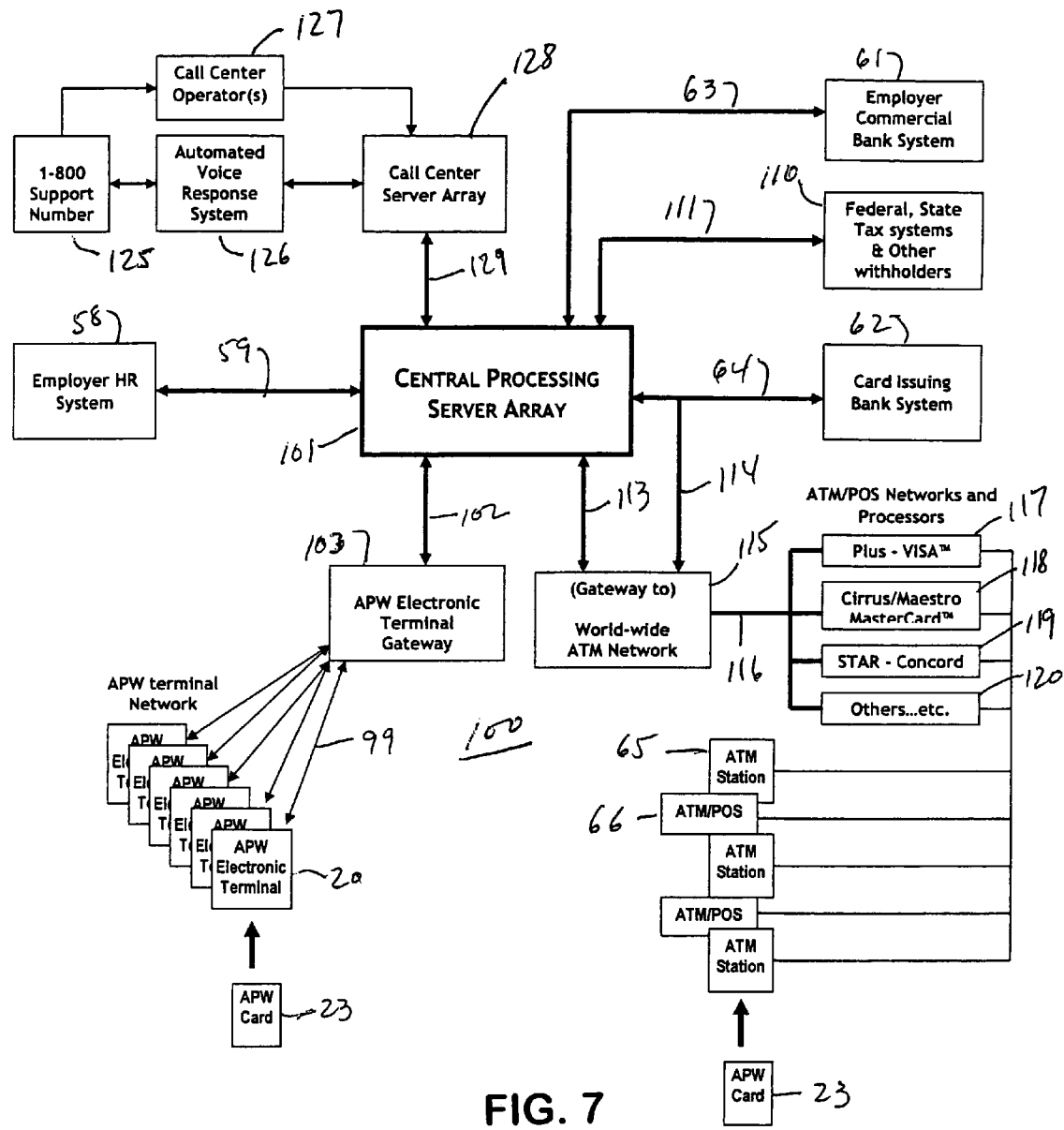
FIG. 7 is block diagram illustrating the entire ATM, payroll and work management system in greater detail than FIGS. 4 and 5.

Illustrated in FIG. 7 is a payroll and work management system, generally designated 100. Payroll and work management center 100 is the preferred embodiment an APW system in accordance with this invention. A plurality of APW terminals 20 communicate via links 99, which may be via an internet or PSTN link 56 or a wireless link 51 (FIGS. 4 and 5) to an APW electronic terminal gateway 103. Gateway 103 is equipped with modems and transceivers to receive the communications from the APW terminals 20. Gateway 103 may also be equipped with a conventional firewall to protect a central processing server array 101 from unauthorized access. Information to and from APW terminals 20 is communicated between the array 101 the gateway 103 via lines 102. Gateway 103 may be physically located near array 101 or gateway 103 may be located at an employer's site where it communicates with a plurality of APW terminals 20.

Figure 8:
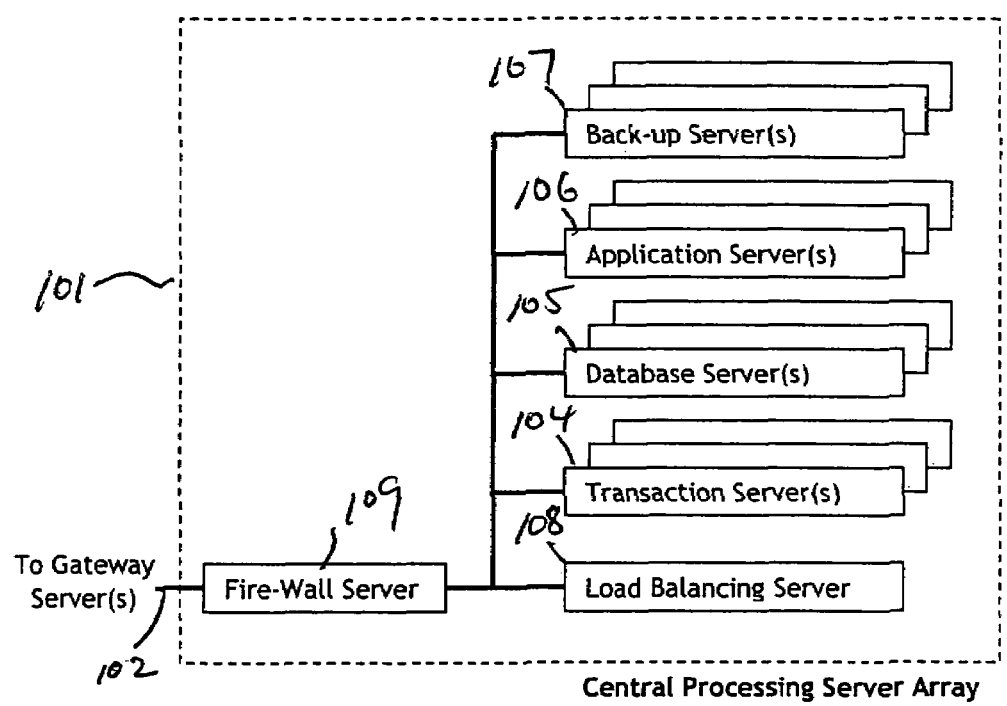
FIG. 8 is an exploded block diagram of the central processing server array shown in FIGS. 4, 5 and 7.

Central processing server array 101 is shown in greater detail in FIG. 8. Array 101 may typically consist of a plurality of servers, such as a plurality of transaction servers 104, a plurality of database servers 105, a plurality of application servers 106, a plurality of back-up servers 107 and a firewall server 109. Of course, the server array 101 can be implemented in a variety of other ways, such as with an Intel™-based computer, a Unix™-based computer, a mainframe computer or the like. Array 101 operates in general as a multi-purpose computer to receive, send, process and store information.

A plurality of server arrays 101 may be distributed in selected locations in a nationwide system, such as in Chicago, New York, Atlanta, Los Angeles, Denver and so forth. The APW terminals 20 will then generally communicate with the nearest server. Preferably, back-up servers are also provided to prevent the loss of stored information and to provide continued processing services in case any one server array becomes non-functional.

The server array 101 operates substantially as already described with reference to FIGS. 4 and 5. Array 101 periodically communicates with the employer's HR system 58 to obtain updated employee information. After calculating a payroll, the array 101 issues electronic fund transfers (EFTs) to transfer funds from the employer's commercial bank 61 to the appropriate federal, state and local taxing authorities 110 for the withheld taxes, FICA and other applicable taxes. The array 101 records all transactions and is able to track the history of all payments.

Server array 101 also issues EFTs upon calculating the payroll from the employer's account at employer's bank 61 through a worldwide ATM network gateway 115. An electronic file containing the amount of the net pay to be credited to each employee's account is sent to the appropriate ATM network processor, such as Plus™ 117, Cirrus™ 118, STAR™ 119 or others 120. Thus, each APW card account is incremented with that employee's net pay. The server array 101 then contacts the appropriate card issuing bank, such as bank 62, to confirm the success of the EFT transfers, as by comparing the total deposit with the sum of all the individual employee net payments. If the EFTs were successful, each employee should have his/her account credited by the appropriate amount of net pay.

ATM networks and processors, such as Cirrus™/Maestro™ 118 owned by MasterCard™, Plus™ 117 owned by VISA™ and Star™ 119 owned by Concord EFS™ are entities that own and link many ATM machines. These entities are in effect service providers for their respective ATM machines. These networks 117–120 have central processing systems that permit funds to be deposited to accounts such as those associated with each employee's APW card. Similarly, these processing systems of the networks 117–120 debit the cardholder's account if cash is withdrawn at an ATM 65 or a purchase is made at a POS 66, such as at a grocery store, gas station or the like. Typically, the POS 66 makes a modem connection with one of the networks and processors 117–120 to process an EFT in the amount of the purchase for credit to the appropriate merchant.

The payroll and work management system 100 also has a call center including a 1–800 support number 125, an automated voice response (AVR) system, one or more call center operators and a call center server array 128. Thus, an employee having difficulty with any APW terminal 20 may call the 1–800 number for help with a transaction, system status, payroll or balance inquiries or the like. Call center operators 127 may have a personal computer to access the central processing server arrays 101 via the call center server array 128 to obtain information about the inquiring employee's account by first logging into central processing server array 101. When using the AVR system 126 from a remote telephone, the inquiring employee uses the matrix of keys on the telephone to access the desired information by following the commands issued by the voice response system in a manner known to the art. The employee logs onto array 101 by entering the bank account number on the APW card and then entering the associated PIN or by use of the fingerprint reader 30, or a combination of both depending upon the desires of the employer. Alternatively, authentication may include the bankcard 23 or the fingerprint reader 30 in combination with an employee ID number.

It will be appreciated that any employee will have considerable reluctance to give even his/her best friend their APW card and PIN. This is because the friend will then be able to access that employee's bank account associated with the account number and the PIN. Even if the friend does not fraudulently withdraw funds from the bank account, the friend will be able to view recent account activity at the APW terminal. Thus, the APW card and PIN operate very effectively to significantly reduce the buddy-punching problem. This may be nearly as effective as any known biometric system. On the other hand, some employers feel that a biometric device, such as fingerprint reader 30 offers better immunity to buddy punching because of the uniqueness of fingerprints.

The APW system also significantly reduces the expenses associated with the conventional activities of processing time sheets and then issuing and distributing checks. Moreover, the APW system readily provides available payroll funds without the expenses attendant to cashing payroll checks at an alternative financial service provider, and provides for more frequent payrolls, such as on a daily basis. It also provides an effective bank account for all employees. Employees may obtain a printed payroll stub at any APW terminal, complete with details on the gross pay, deductions and net pay. Work assignments may also be available for viewing and printing at any APW terminal.

FIGS. 9–24 illustrate screens that may appear on the display the various functions that may be available on terminal 20 for use by employees and supervisors.

Figure 9A:
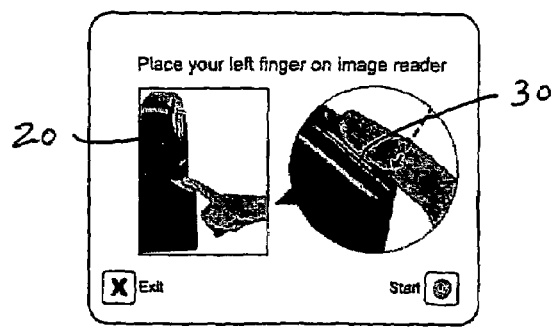
FIGS. 9A–9G illustrate typical screens that may be used on the display of the electronic terminal shown in FIG. 1 during authentication of an employee or supervisor before he/she can gain access to initiate additional functions or procedures.
Figure 9B:
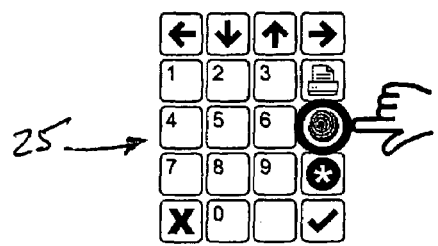
Figure 9C:
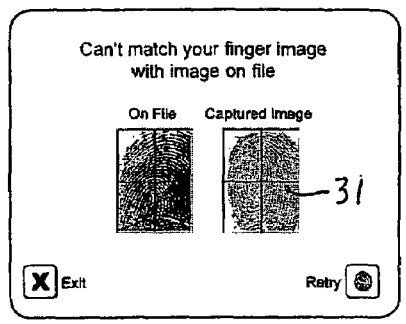
Figure 9D:
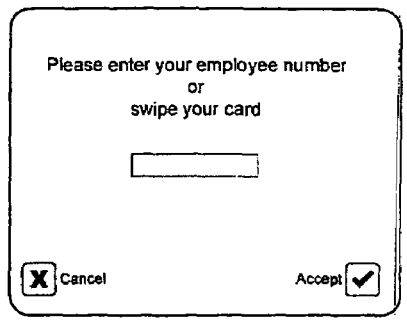

FIGS. 9A–9G illustrate typical screens that may appear on the display 21 of terminal 20 during the authentication procedure, which must be satisfactorily performed prior to obtaining access of any of the other available functions on terminal 20. The initial screen in FIG. 9A instructs the employee to place a finger on the fingerprint reader 30 of terminal 20. Use of a left finger on fingerprint reader 30 is preferable since it keeps the right hand conveniently available for making entries on keyboard 25 or on touch-sensitive screen 21. Of course, if fingerprint reader 30 was disposed on the right side of terminal 20, the opposite would be true, i.e., it would be preferable to read a right finger to keep the left hand available for keyboard or screen entries. When the employee is ready, he/she is instructed to actuate the fingerprint reader by touching the start button on the screen or by actuating the fingerprint reading key on the keyboard 25, as shown in FIG. 9B. Terminal 20 then compares the fingerprint from fingerprint reader 30 with fingerprints scans that were made when the employee was first registered on the APW system. The initial registration procedure, which captures images of the employee's fingerprints, is presented in greater detail below with reference to FIGS. 17A–17H. If the fingerprint reading is matched with a fingerprint on file, such as in a memory of terminal 20 or in the APW system, the next screen to appear on terminal 20 may be the screen in FIG. 9D requesting further information, such as an employee number, which may be a social security number, or requesting that the employee swipe his/her bankcard 23 in the slot of the bankcard reader 22. Note that in this example, the social security number or bankcard information is used to supplement the fingerprint identity, but some employers may be satisfied with only the use of the fingerprint verification or bankcard verification for purposes of check-in. Of course, if only bankcard verification is used for authentication on terminal 20, the employee may also be directed to enter a personal identification number associated with the bankcard number. After entering the social security number or swiping the bankcard, the employee presses the check or accept key on keypad 25 or on screen 21 to continue as shown in FIG. 9D. If only fingerprint identity is used for punching in, the authentication process may skip to the screen of FIG. 9E in which the employee is welcomed by his/her name and provided with various options for further action such as checking in or checking out of work.

However, if terminal 20 cannot match the fingerprint from reader 30 with a corresponding image on file, the screen of FIG. 9C will appear advising of the inability to match the fingerprint. Preferably, there will be a side-by-side comparison of the closest print on file and the currently read image. Orthogonally disposed crosshairs 31 may indicate that the employee placed his/her finger too high or too low, or too far to the left or right, compared with the file image. Preferably, the origin of the crosshairs 31 will coincide near the center of the fingerprint image. Thus, the side-by-side images will assist the employee in attempting to get better centrally located placement of his/her finger on the next reading attempt. The next reading attempt is initiated by the retry button on the screen in FIG. 9C or by again pressing the fingerprint read button on keypad 25 (FIG. 9B). Of course, if the additional employee information of FIG. 9 is available as alternative authentication information, the employee may elect to provide this information instead of continuing the fingerprint reading access to the system. Typically, after two or three unsuccessful attempts of fingerprint reading, the screen of FIG. 9F will appear advising the employee is advised that his/her supervisor will approve of the unmatched fingerprint images at a later time. The screen of FIG. 9G then appears to permit punching in or out of work. Since the employee failed in his/her attempts to properly pass the authentication steps, the screen of FIG. 9G does not provide the employee with access to any accounts associated with the bankcard, preferences or access to administration, as in the screen in FIG. 9E.

Figure 9E:
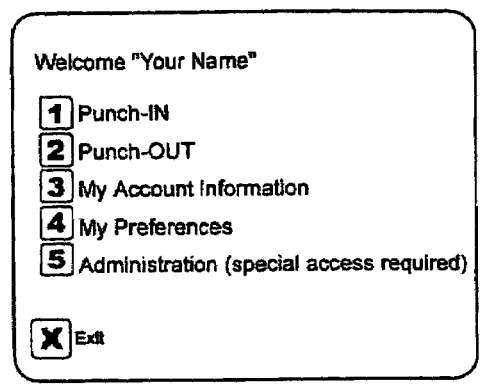
Figure 9F:
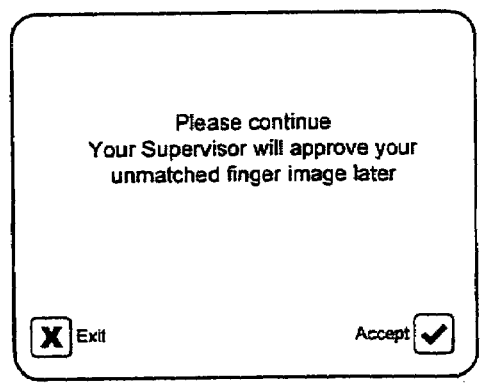
Figure 9G:
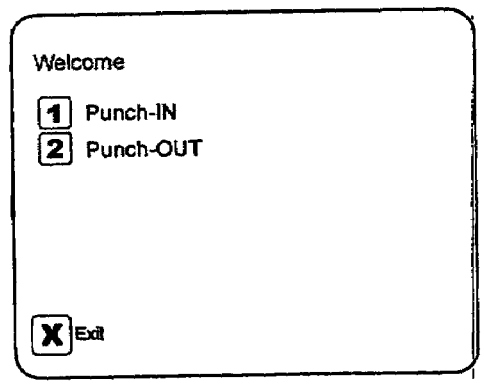
Figure 10A:
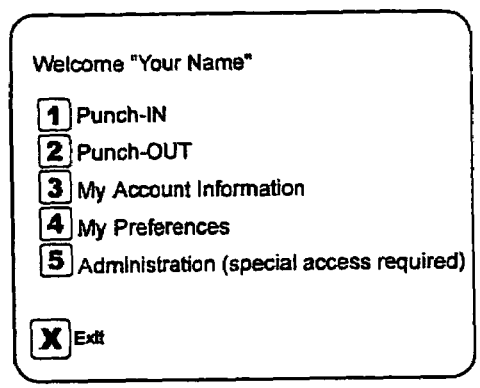
FIGS. 10A–10C illustrate typical screens that may be used on the display of the electronic terminal during punching in at work.
Figure 10B:
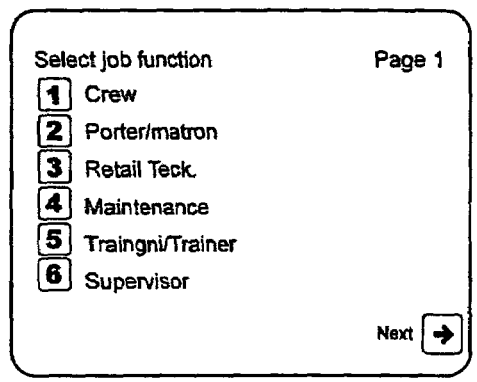
Figure 10C:
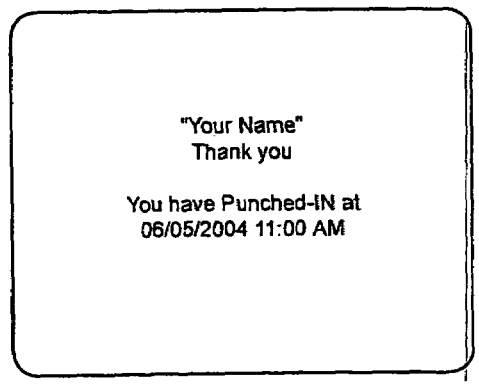

The punch-in procedure on terminal 20 is shown in FIGS. 10A–10C. After successful authentication in FIGS. 9A–9E, the screen of FIG. 9E appeared. The screen in FIG. 9E is the same as the screen in FIG. 10A, which is the beginning of the punch-in procedure. This screen will be called the "main page" since it is the starting point after authentication and since it provides a menu of available functions for the employee to select from, including punch-in. Other available functions that can be selected include punch-out, account information, preferences and administration. These additional functions will be presented in further detail below.

The desired function is selected by touching the desired touch-sensitive button in the screen of FIG. 9E or by entering the associated number 1 on keyboard 25. After selecting to punch-in, the employee may be presented with a menu of job functions, such as that shown on the screen in FIG. 10B. Some employees may have potentially more than one job function and different rates of pay may apply to different job functions. The employee will select the appropriate job function for that day. Note that the employee may also change job functions during the same day by checking out and then rechecking in and entering a new job function for the next portion of the day, or for the remainder of the day. In the example of FIG. 10A, the employee selects the supervisor job function by pressing the numeral 6 on keypad 25 and then pressing the "next" key, which is also the right arrow key on keypad 25. However, pressing the next key before selecting any job functions displayed on the screen shown in FIG. 10B may provide additional job function choices. After selecting a job function in FIG. 10B, the screen in FIG. 10C confirms that the employee has successfully checked in and displays the time of check-in.

Figure 11A:
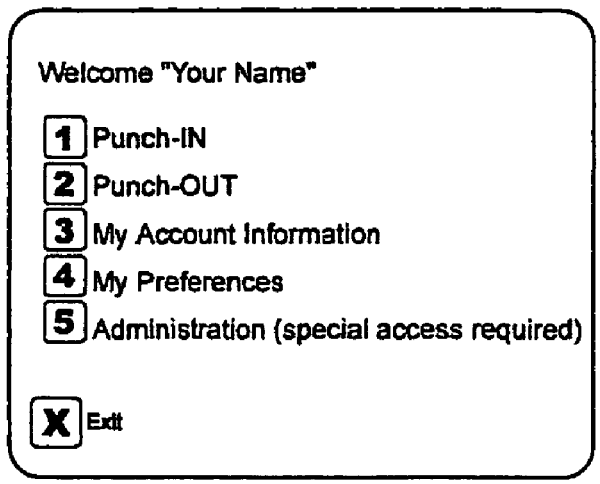
FIGS. 11A–11B illustrate typical screens that may be used on the display of the electronic terminal during punching out at work.
Figure 11B:
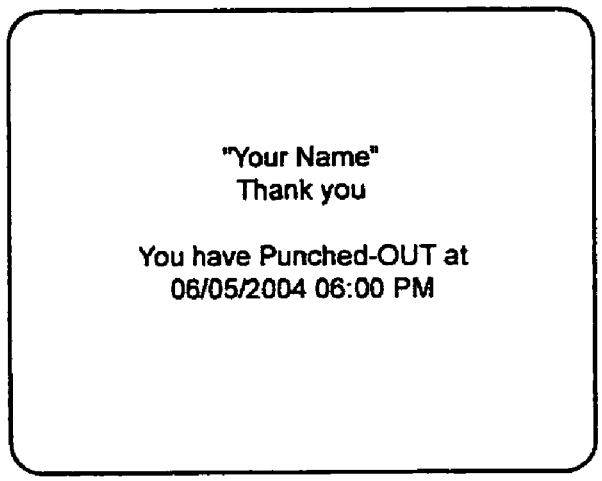
Figure 12A:
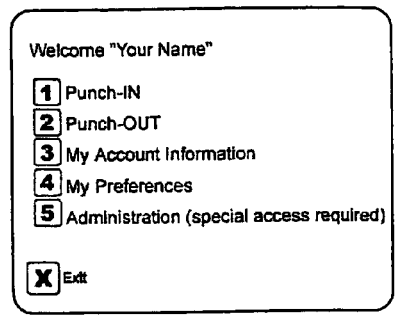
FIGS. 12A–12F illustrate the typical screens used on the display of the electronic terminal of FIG. 1 to enable an employee to correct any missed punch-ins.
Figure 12B:
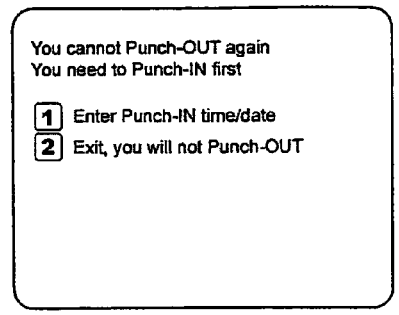
Figure 12C:
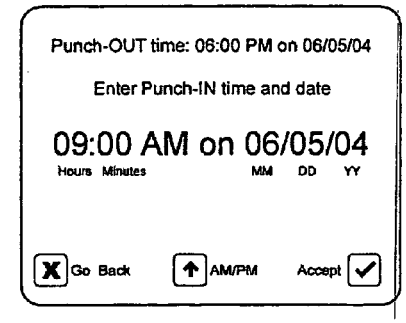
Figure 12D:
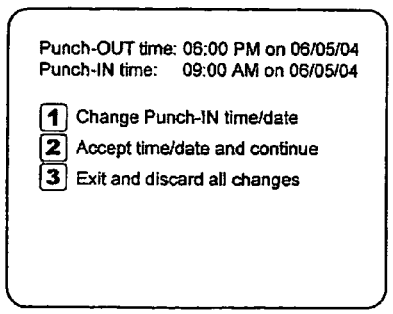
Figure 12E:
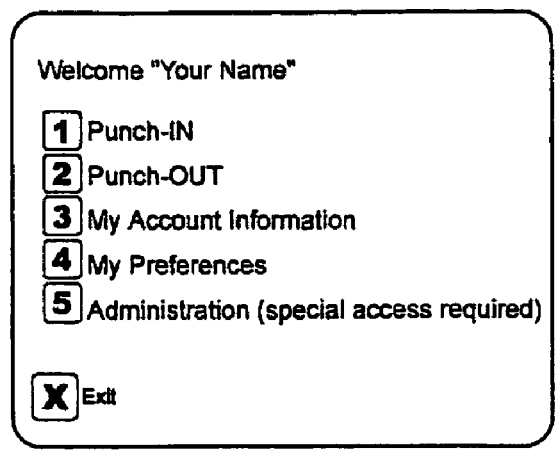
Figure 12F:
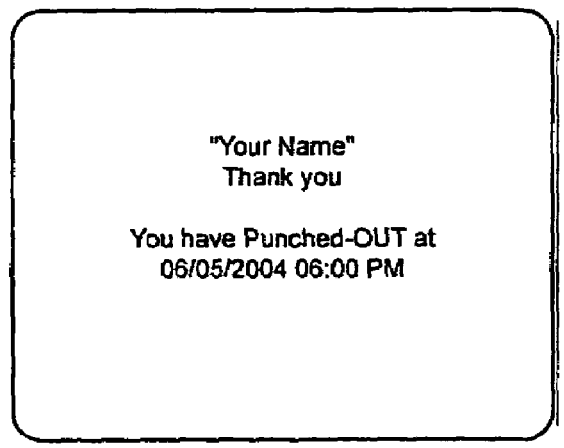
Figure 13A:
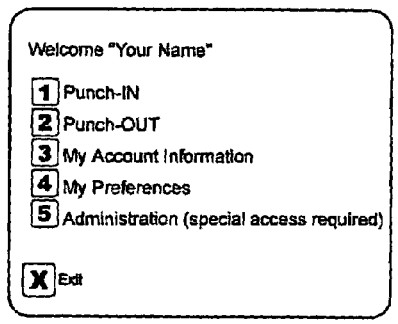
FIGS. 13A–13G illustrate the typical screens used on the display of the electronic terminal of FIG. 1 to enable an employee to correct any missed punch-outs.
Figure 13B:
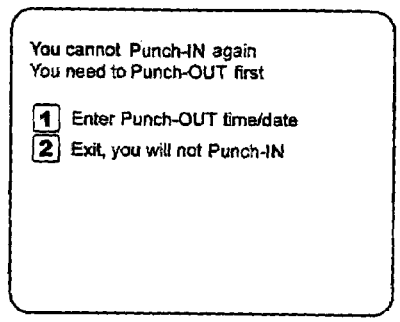
Figure 13C:
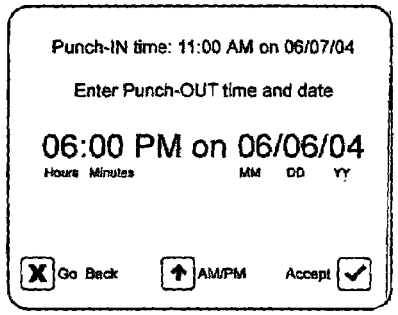
Figure 13D:
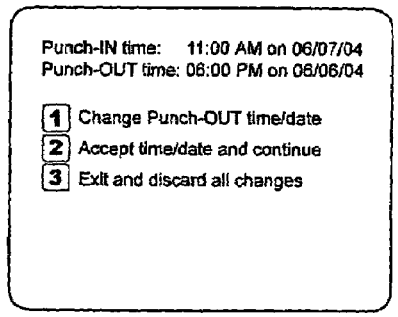
Figure 13E:
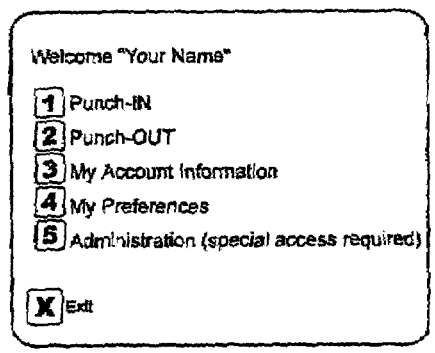
Figure 13F:
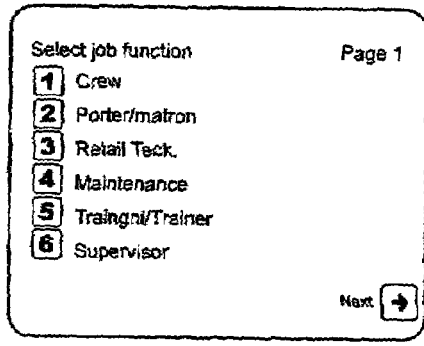
Figure 13G:

The punch-out procedure is shown in FIGS. 11A and 11B and begins with the main page of FIG. 11A. Punching out is initiated by touching the second listed item in FIG. 11A or by pressing the 2 key on keypad 25. The screen of FIG. 11B appears, which identifies the employee by name and confirms the time and date of punching out.

Occasionally, an employ may fail to punch-in for work because he/she forgot, was distracted, or the like. The procedure shown in FIGS. 12A–12F enables the employee to supply the missing punch-in time when he/she punches out. In the example of FIGS. 12A–12F, the employee is first responsible for entering the missed punch-in time. The supervisor will later review the employee's entries for the missed punch in and either approve them as entered or edit them in accordance with FIGS. 20A–20H. After authentication and presentation of the main page in FIG. 12A, if the employee tries to punch-out with a missed punch-in, the employee is advised in the screen of FIG. 12B that he/she cannot punch-out again before first punching-in. The screen in FIG. 12B invites the employee to select the first option by pressing the numeral 1 key to manually enter his/her missed punch-in time. The screen of FIG. 12C then appears and enables the employee via keypad 25 to enter the punch-in time and date, as well as the AM/PM designation with the up/down arrow keys. Pressing the accept or check key will save the entered data relating to the missed check-in time. The screen in FIG. 12D then displays the entered punch-in time plus the current punch-out time. Further editing of the data is permitted by pressing the numeral 1 key, acceptance of the data occurs if the numeral 2 key is pressed, or the entered data is discarded if the numeral 3 key is pressed. If key 2 is pressed to accept the times shown, the employee is thanked at the screen of FIG. 12F.

A similar procedure enables the employee to supply any missing punch-out time. This procedure shown in FIGS. 13A–13G enables the employee to supply the missing punch-out time when he/she next attempts to punch-in. In the example of FIGS. 13A–13G, the employee is first responsible for entering the missed punch-out time. The supervisor will later review the employee's entries for the missed punch-out and either approve them as entered or edit them in accordance with FIGS. 19A–19E, as described below. After authentication and presentation of the main page in FIG. 13A, if the employee tries to punch-in with a missed punch-out, the employee is advised in the screen of FIG. 13B that he/she cannot punch-in again before first punching-out. The screen in FIG. 13B invites the employee to select the first option by pressing the numeral 1 key to manually enter his/her missed punch-out time. The screen of FIG. 13C then appears and enables the employee via keypad 25 to enter the missing punch-out time and date, as well as the AM/PM designation with the up/down arrow keys. Pressing the accept or check key will save the entered data relating to the missing punch-out time. The screen in FIG. 13D then displays the entered punch-out time plus the current punch-in time. Further editing of the data is permitted by pressing the numeral 1 key, acceptance of the data occurs if the numeral 2 key is pressed, or the entered data is discarded if the numeral 3 key is pressed. If key 2 is pressed to accept the times shown, the employee is prompted at the screen in FIG. 13F to select the appropriate job function upon checking-in. The employee is then thanked at the screen of FIG. 13G, including confirmation of the current check-in time.

Figure 14A:
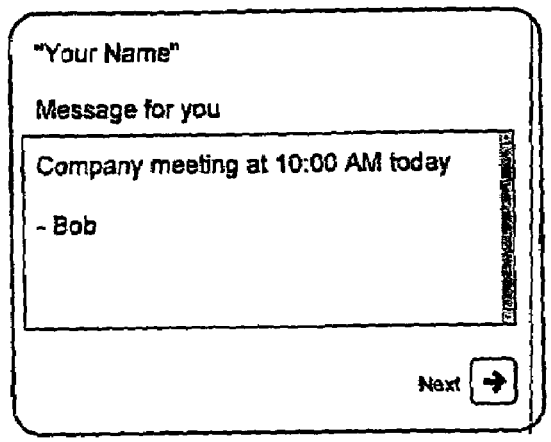
FIGS. 14A–14B illustrate the typical screens used on the display of the electronic terminal of FIG. 1 to review and print any messages.
Figure 14B:
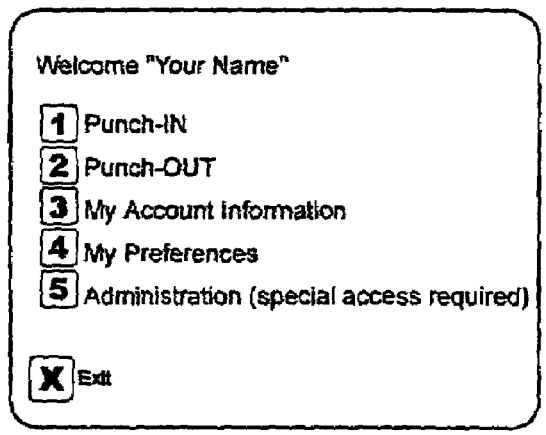

FIGS. 14A–B are concerned with reviewing and printing any messages. After employee authenication, any message, such as that displayed in FIG. 14A will appear before the main screen appears. The content of the messages can vary significantly, such as that of a scheduled meeting in FIG. 14A, the need to call someone, a changed work assignment, a changed work location, an additional work assignment, a request to accept a different job function for the day, or the like. The employee may press the print key shown on keypad 25 in FIG. 9B (above the fingerprint activation key) to print a copy of the message. Pressing of the next or right arrow key in FIG. 14A will take the employee to the main screen of FIG. 14B. The employee can then select one of the main menu options or exit the terminal 20.

Figure 15A:
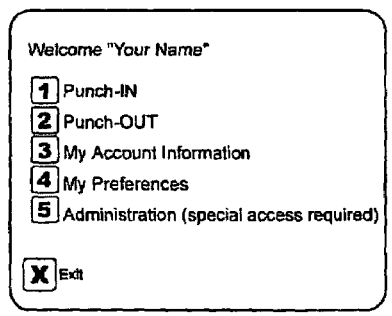
FIGS. 15A–15D illustrate typical screens that may be used on the display of the electronic terminal of FIG. 1 to review a payroll and to print a pay stub.
Figure 15B:
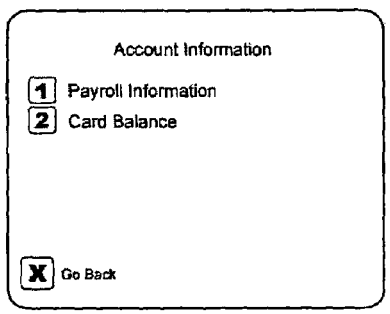
Figure 15C:
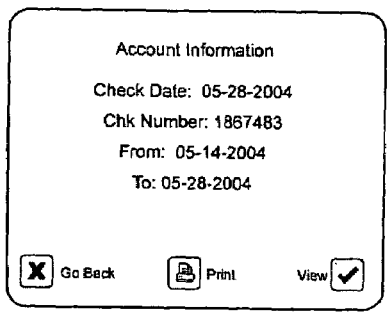
Figure 15D:
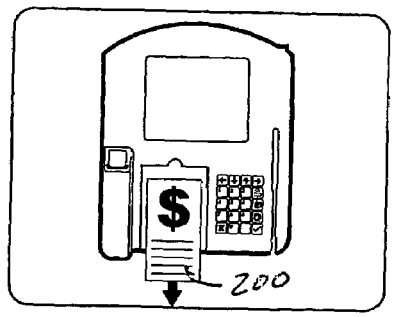
Figure 16A:
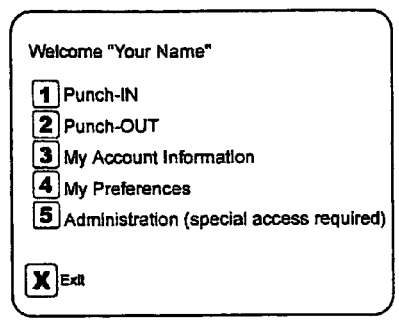
FIGS. 16A–16D illustrate typical screens that may be used on the display of the electronic terminal of FIG. 1 to review the balance remaining on the bankcard and to print the balance.
Figure 16B:
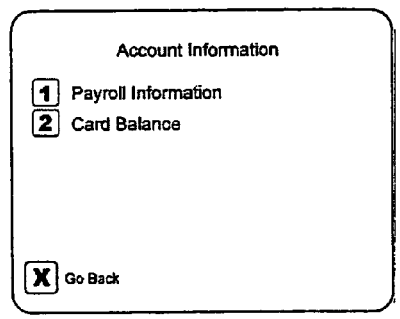
Figure 16C:
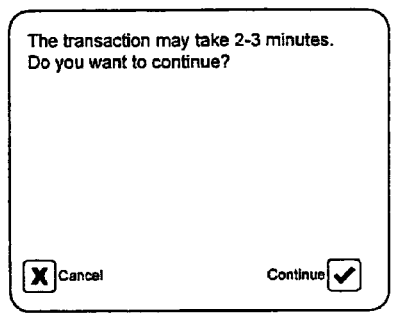
Figure 16D:
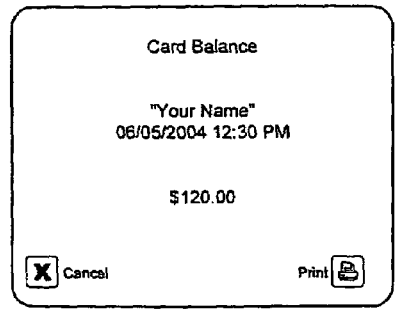

FIGS. 15A–D show the steps utilized to review payroll information and to print a payroll stub. After system authentication of the employee, the employee enters the numeral 3 key on the keypad in FIG. 15A to access My Account Information. In FIG. 15B, the employee enters the numeral 1 key to access payroll information. The screen in FIG. 15C will appear showing the check reference number, the pay period and the date of the check or payment to the bankcard. If the print key on keypad 25 is pressed, a payroll stub 200 will be printed from terminal 20 as shown in FIG. 15D.

A universal payroll stub format should be suitable to send, receive, display, deliver and print any type of payroll stub over the following media:

The All purpose ATM device

Over the web

Over the phone via an Integrated Voice Response (IVR) system

One of the main problems in printing a universal stub is the ability to send, receive and print multiple employees and multiple employer payroll information. For example some employees might be enrolled in a 401K program, while others have to pay alimony. Some employers offer a payroll deduction credit for a specific health or benefit program while others don't. We've developed an infrastructure and communication methodology which handles, delivers, displays and prints, any type of payroll stub information. Our universal payroll stub infrastructure id designed using the following format:

Prior to sending and/or receiving a payroll stub to a device, web or IVR system, the employer must send us a template header record infrastructure detailing the general display of the paystub. Such a template would contain records such as (1) GROSS PAY, (2) DEDUCTIONS, (3) TAXES (4) NET INCOME. From now on, any record received from the employer would be classified using the employer's record schema Then, every payroll stub record must contain the point to the employer's template schema file. For example to show that Joe Crew has $1,000 in Wages for this pay period, and $5,000 in Wages Year-To-Date (YTD); and that he received $100 in bonus pay for this pay period and $300 in total YTD bonus pay. The employer would send the information in the following structure:

"1", "Wages", 1000, 5000

"1", "Bonus Pay", 100, 300

This automatically generates payroll stub information in the following format:

| | GROSS PAY | |
|---|---|---|
| | Current | Year to Date |
| Wages | $1,000.00 | $5,000.00 |
| Bonus Pay | $100.00 | $300.00 |

According to many state labor regulations, employer must give en employee a physical printout of his/her payroll stub on pay day at the location of work. Although many employers offer their employees direct deposit and give them access to electronic payroll stubs via secure internet, this approach is not feasible for a low wage employee, who usually does not have access to a PC or the internet. As a result, from an employer's perspective electronic payroll to a low wage employee is a losing proposition. This is because, even though, the employer is saving cost from mailing a physical paper check to a remote low wage employee, the employer still has to mail a physical paper pay stub to the employee in order to comply with state labor regulations. If this is the case, then the employer might as well send a paper paycheck with a paper paystub and avoid the hassles of integrating electronic payroll with mailing a paper paystub to all low wage labor locations. Using the all purpose biometric device, upon accessing the system, and if today is payday, the employee is prompted to print his/her paystub. See, the flow chart of FIG. 30 for further details. This approach gives employers compliance with state and federal labor laws, this is because:

a. Employee was paid on pay day via electronic payroll deposit (on payroll card)

b. Employee was presented with a payroll stub at work location. Employer has a record that the employee decided to either print or not print his/her payroll stub on payday, at the work location.

FIGS. 16A–D illustrate the steps used for viewing and printing the current balance remaining on the bankcard 23. After correctly authenticating with the system, the employee is welcomed at the main screen shown in FIG. 16A. If the employee selects the My Account Information by pressing the numeral 3 key on keypad 25. the screen shown in FIG. 16B will then appear. To review the balance on the bankcard, the employee presses the numeral 2 key on the keypad to select "Card Balance". The employee is advised in FIG. 16C that there may be a short delay in retrieving the requested information and he/she is requested to press the check button on the keypad to continue. If the employee elects to continue, a short time later, a screen similar to that in FIG. 16D appears, advising the employee of the balance then remaining on the bankcard. The employee may then print the balance in the bankcard account by pressing the printer key on the keypad 25 (FIG. 9B). Whether the screen of FIG. 14D is printed or not, if the employee presses the cancel button on the keypad, the screen returns the Account Information screen of FIG. 16B. Entering the go back or cancel button again will return the employee to the main screen of FIG. 16A, where the employee may select additional options, including punch-in and punch-out or selecting exit. If the employee does not return to the main screen of FIG. 16A, the terminal 20 will automatically revert to the starting screen after a predetermined time of inactivity.

Figure 17A:
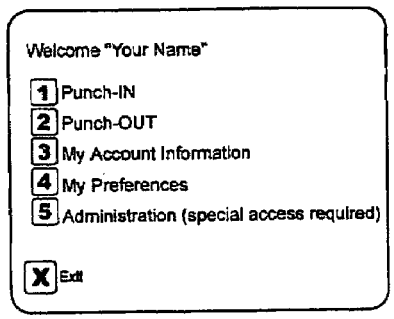
FIGS. 17A–17H illustrate typical screens that may be used on the display of the electronic terminal of FIG. 1 to add or register new employees.
Figure 17B:
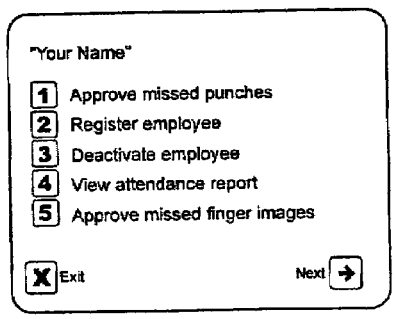
Figure 17C:
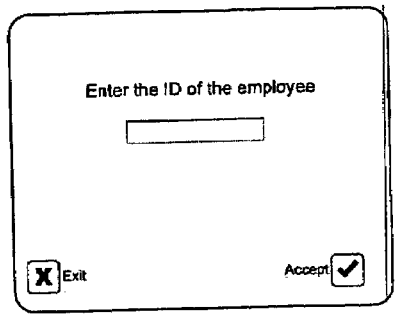
Figure 17D:
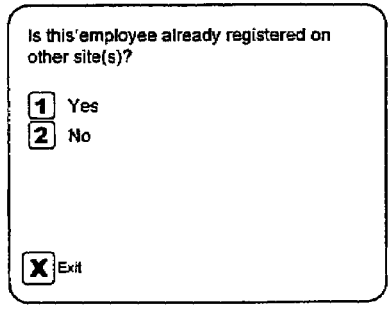

FIGS. 17A–17H illustrate the procedure for registering a new employee, including obtaining useable fingerprint images from the new employee with the fingerprint reader 30 of terminal 20 for later use in the authentication procedures of FIGS. 9A–9G, above. This entails providing about three images of a finger, such as the left index finger, to the system for subsequent comparisons during future uses of the terminal 20. In FIG. 17A, a supervisor selects the Administration function by pressing the 5 key on keypad 25. In FIG. 17B, the supervisor selects the Register Employee function by pressing the 2 key on keypad 25. In the screen of FIG. 17C, the identity of the new employee, such as an account number associated with bankcard 23, a social security number, or other employee number is entered via keypad 25. Such an employee ID number will be associated with fingerprint images by the APW system and/or terminal 20 in subsequent authentication procedures. When the employee ID number is entered and the check or accept box is actuated, the screen of FIG. 17D appears asking if the new employee is already registered on a different site or location. If so, fingerprint images already in the system may be used at the new work location. If not, the procedure continues to the screen of FIG. 17E.

Figure 17E:
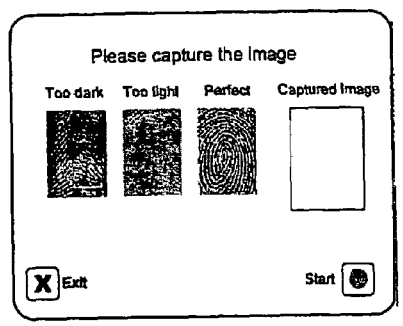
Figure 17F:
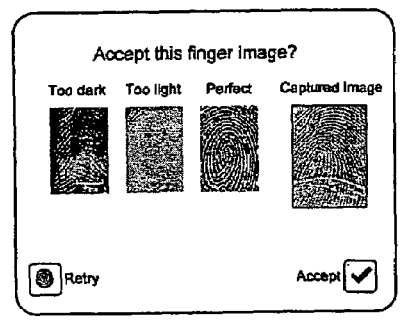
Figure 17G:
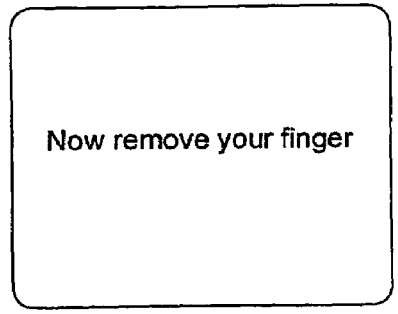

In FIG. 17E, the new employee is then requested to capture a fingerprint image by placing a finger on the fingerprint reader 30, as in FIG. 9A. In the example of FIGS. 17A–17H, the new employee may a supervisor since supervisors must also register with the system in order to gain access thereto. Pressing of the fingerprint reader button captures the fingerprint image and displays it on the screen shown in FIG. 17F. The captured image is compared to acceptable and unacceptable images and the employee is prompted to decide whether to accept the captured image as a reference image for future comparison efforts during authentication procedures. As seen in FIG. 17F, the perfect image is one that is not too dark, nor too light, and which displays sufficient fingerprint detail. Preferably, the image of the fingerprint captures the whorl, and has differentiated ridge and valley areas with distinct lines of relatively high contrast. A poor image may be due to a dirty finger, placing the finger too high or too low on the reader 30, or using too much or too little pressure against the reader.

Figure 17H:
Figure 18A:
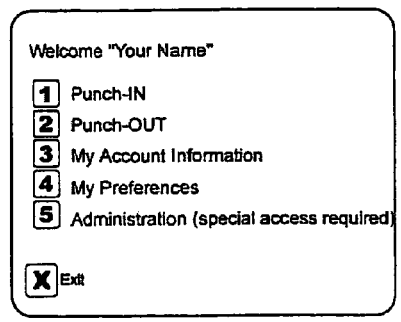
FIGS. 18A–18E illustrate the typical screens used on the display of the electronic terminal of FIG. 1 for a supervisor to register an employee at another work site.
Figure 18B:
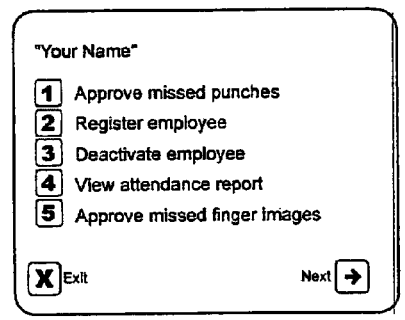
Figure 18C:
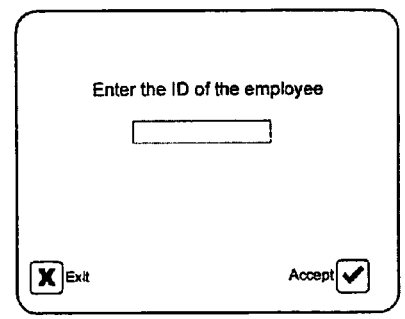
Figure 18D:
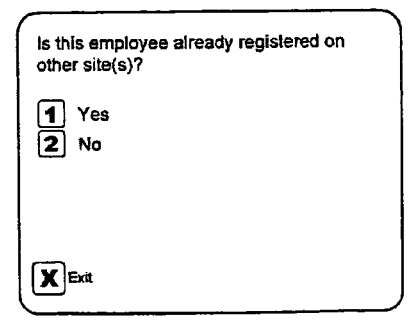
Figure 18E:
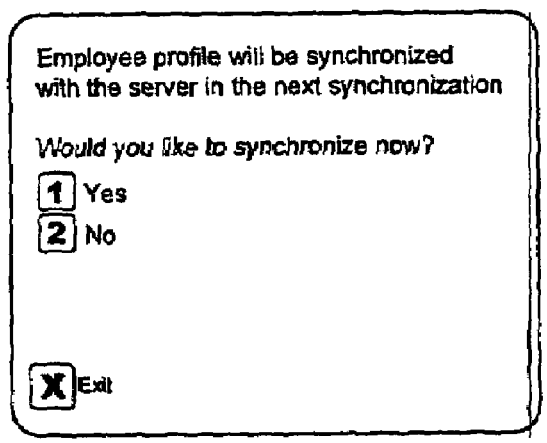

While reference is frequently made to the employee in these registration steps, it will be understood that a supervisor is typically assisting the new employee and that the supervisor may be deciding whether a captured image is suitable for saving for future reference purposes. If the first captured image is accepted by pressing the accept button on the screen or the accept key on keypad 25, terminal 20 may then request that additional images of the fingerprint be entered and captured for future comparison purposes. When the appropriate number of images has been captured, the employee is instructed to remove his/her finger from the fingerprint reader 30 in FIG. 17G. Preferably, about three fingerprint images may be captured for this purpose. In FIG. 17H, the terminal then reverts to the main supervisory page.

FIGS. 18A–18E illustrate the steps of registering a new employee that is already registered on another site of the APW system. Screens in FIGS. 18A through 18D are the same as in FIGS. 17A–17D and the process is similar up to FIG. 18D. If in FIG. 18D, the "Yes" option is selected, the APW system will search for registration information relating to this new employee at the new site. When the registration information is found, the screen appearing in FIG. 18E will appear requesting whether the supervisor wants to synchronize now or later. In either instance, the registration information for this new employee will be transferred from the site where the information resides to the new work site upon the next synchronization procedure within the APW system.

Figure 19A:
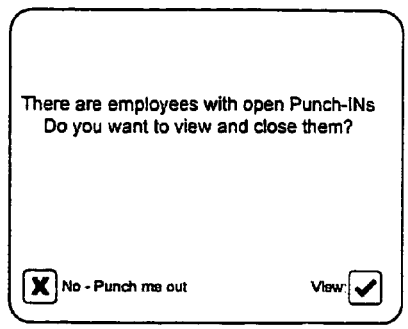
FIGS. 19A–19E illustrate the typical screens used on the display of the electronic terminal of FIG. 1 for a supervisor to approve of, or to edit, the missed punch-out information that was entered by the employee.
Figure 19B:
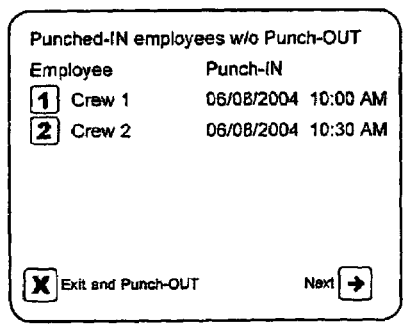
Figure 19C:
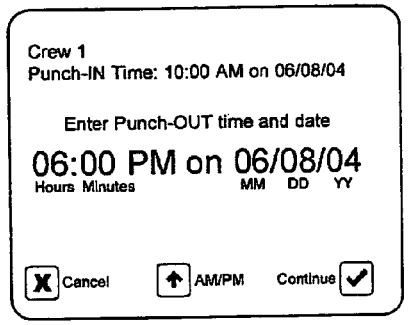
Figure 19D:
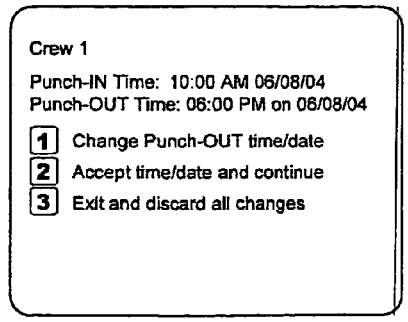
Figure 19E:
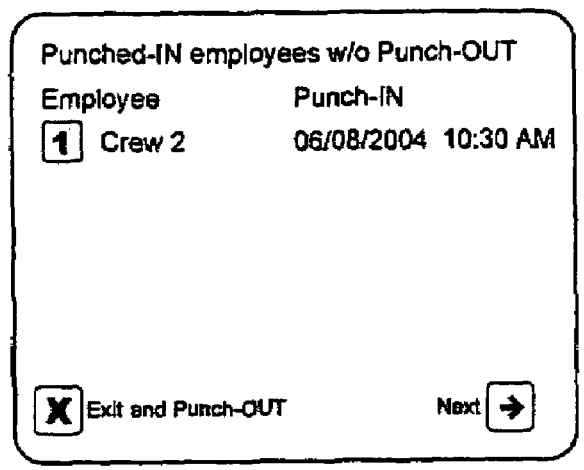

FIGS. 19A–19E illustrate steps that a supervisor may take to punch-out employees when the supervisor punches out. In FIG. 19A, a supervisor upon punching out will be notified of any employees that have previously punched-in but have not yet punched-out (open punch-ins). In FIG. 19B, those employees that have punched-in are identified with their punch-in times. In FIG. 19C, the supervisor is permitted to enter punch-out times for the employee identified as Crew 1 with the numeric keys on keypad 25. In FIG. 19D, the supervisor can accept the previously entered punch-out time for employee Crew 1. If accepted, the next screen in FIG. 19D identifies the next employee, Crew 2, who has not punched out. The supervisor can then use screens like those in FIGS. 19C and 19D to enter a punch-out time for Crew 2.

Figure 20A:
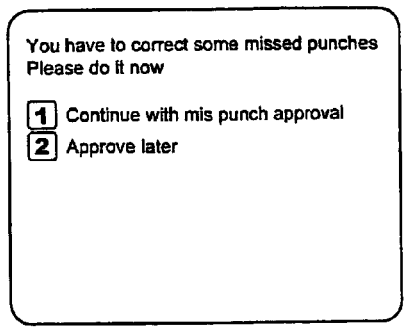
Figure 20B:
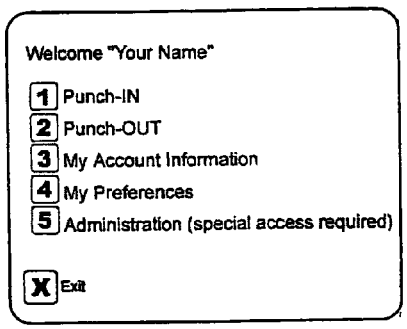
Figure 20C:
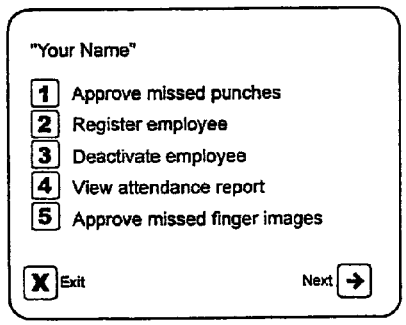
Figure 20D:
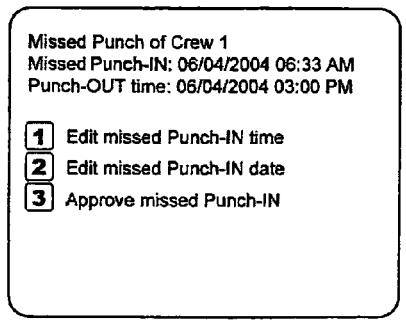

FIGS. 20A–20H illustrate steps that a supervisor may take to review and approve of the time records of employees that have missed punch-in or punch-out times and who have voluntarily entered data relating to the missed punches in accordance with the steps discussed above in FIGS. 12A–12F and 13A–13G. When a supervisor is authenticated with the system, he/she will be notified if any missed punches occurred, as in the screen shown in FIG. 20A. The supervisor may elect to immediately continue with the approval process by pressing the numeral 1 key or to approve later by pressing the numeral 2 key in FIG. 20A, which will activate the main menu screen of FIG. 20B. Selection of the administration menu occurs by pressing the numeral 5 key. The administration menu is shown in FIG. 20C, and the numeral 1 key selects the routine for approving missed punches. As seen in FIG. 20D, the missed punches are then identified by time, date and employee. In this example, employee Crew 1 has punched out, but has missed an earlier punch-in. Thus, the supervisor can elect to edit the missed punch-in time by pressing the numeral 1 key, edit the missed punch-in date by pressing the numeral 2 key, or approve the missed punch-in information as entered by the employee.

Pressing of the numeral 1 key in FIG. 20D, the supervisor is advised of the time that the employee entered for the missed punch-in time in FIG. 20E. If the supervisor disagrees with the time entered by the employee, he/she can use the keypad 25 to enter an alternate time of punch-in. The supervisor can also correct the AM/PM time of the day with the up or down arrow keys on the keypad. After entering any corrections to the punch-in time, the supervisor saves the changes by pressing the check key on the keypad. The supervisor may similarly edit the date of the missed punch-in in FIG. 20F. In FIG. 20G, the supervisor can elect to further edit the time or date of the missed punch-in or approve of the edits entered. Pressing of the numeral 3 key will approve the missed punch-in as corrected by the supervisor. The supervisor will then be advised if any more missed punches need to be corrected. When all missed punches are corrected, the screen of FIG. 20H will advise that there are no more missed punches to review, edit or correct.

Figure 21A:
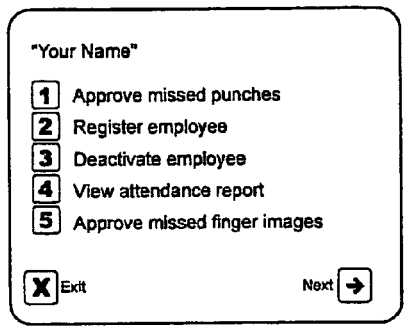
FIGS. 21A–21F illustrate typical screens that may be used on the display of the electronic terminal of FIG. 1 to deactivate an employee.
Figure 21B:
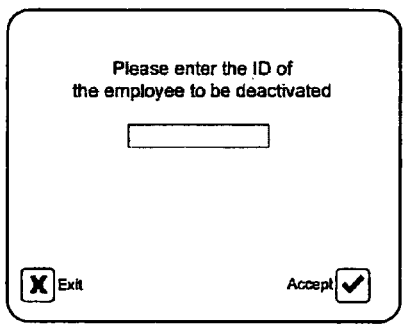
Figure 21C:
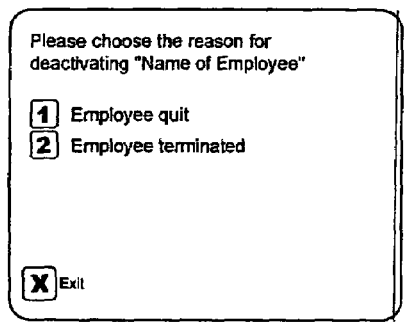
Figure 21D:
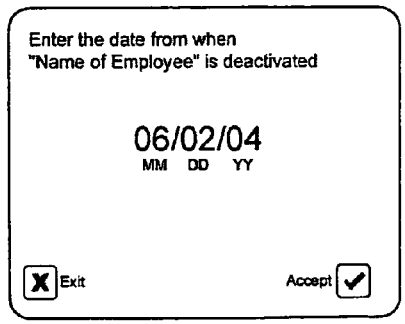
Figure 21E:
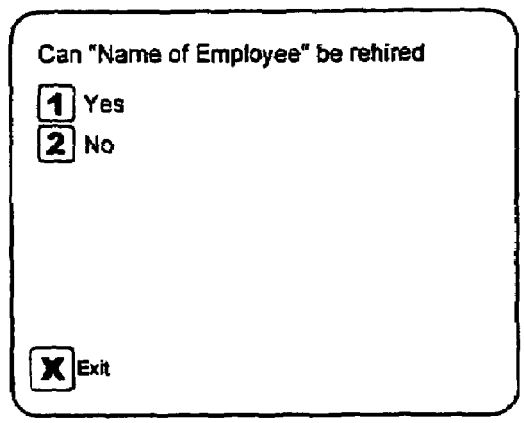
Figure 21F:
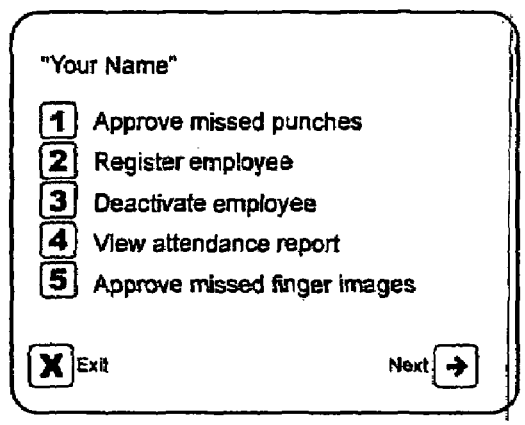

FIGS. 21A–21F relate to the procedure for deactivating an employee. After authentication, a supervisor selects the Deactivate Employee option from the administrative menu of FIG. 21A by pressing the numeral 3 key on keypad 25. In FIG. 21B, the supervisor is prompted to enter the ID number of the employee to be deactivated, which may be the employee's bankcard number, social security number, employee number, or the like. The screen in FIG. 21C then appears requesting the reason for deactivating the identified employee. In this example, the numeral 1 key is pressed to select that the employee quit, rather than was terminated. The screen of FIG. 21D then requests entry of the date of deactivation, which is entered by using the numeral keys on keypad 25. After the accept key is pressed, the supervisor is requested to enter whether the identified employee would be eligible for rehiring in the future, such as on the screen in FIG. 21E. In this instance, the number 2 key is pressed in FIG. 21E to enter that this employee will not be eligible for rehire. When the exit key is pressed, the screen reverts to the supervisory menu of FIG. 21F.

Figure 22A:
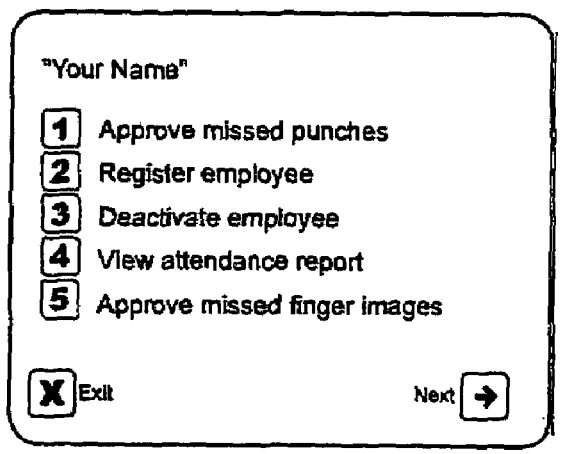
FIGS. 22A–22B illustrate typical screens that may be used on the display of the electronic terminal of FIG. 1 to synchronize a newly entered information at the electronic terminal with the system.
Figure 22B:
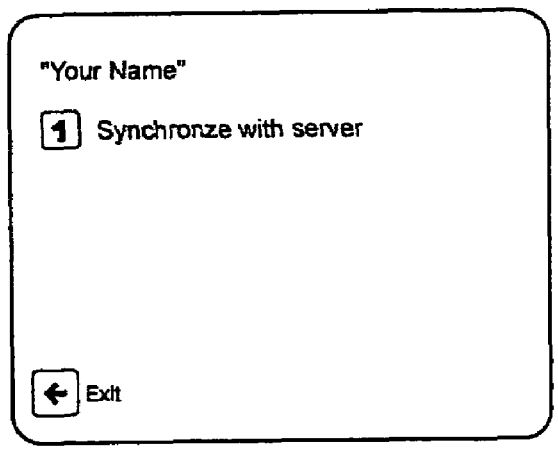

FIGS. 22A–22B illustrate the steps of synchronizing terminal 20 with the APW system. This is required when an additional terminal added to the system, when an existing terminal is replaced or when it is desired to update terminal 20 with the APW system before the next automatic synchronization. Once a terminal is synchronized with the system, it should not normally need to be resynchronized again under normal operating conditions. After the usual authentication procedure, the supervisor sees the administrative screen of FIG. 22A. Since the synchronize option does not appear in the main administrative screen of FIG. 22A, the supervisor selects the next screen with the right arrow key. In the screen of FIG. 22B, synchronize with the server option is selected by pressing the numeral 1 key. Thereafter, the system begins the synchronization procedure with the new terminal 20.

Figure 23A:
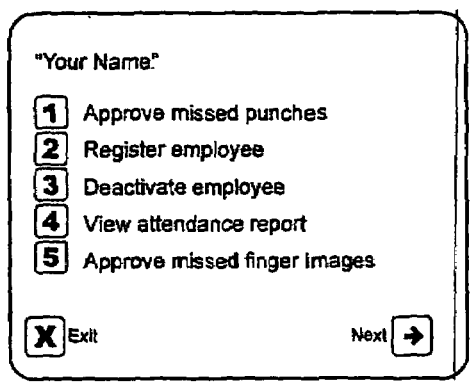
FIGS. 23A–23C illustrate typical screens that may be used on the display of the electronic terminal of FIG. 1 to view attendance reports.
Figure 23B:
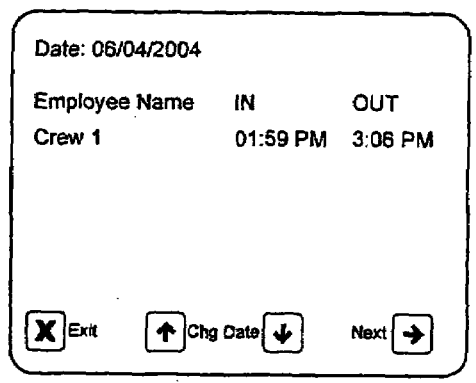
Figure 23C:
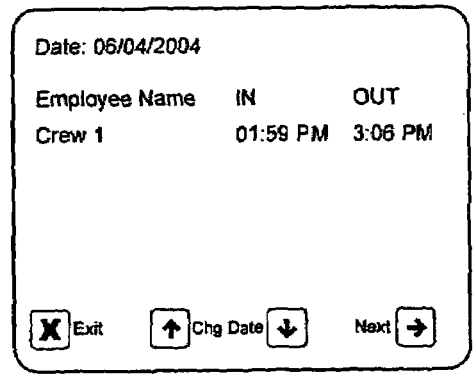

FIGS. 23A–23C illustrate the use of the terminal 20 to view attendance reports by a supervisor. After authentication, the supervisory screen of FIG. 23A appears. The supervisor then elects the View Attendance Report option by pressing the numeral 4 key. The attendance report of the first employee appears in the screen of FIG. 23B. The attendance reports for the same employee, but on other days, can be reviewed by actuating the up or down arrow keys to change the date. To view the attendance records of another employee, the right arrow key is actuated for the next employee. When finishing review of the attendance reports, pressing of the exit key in FIG. 23D returns the supervisor to the main administrative screen of FIG. 23A.

Figure 24A:
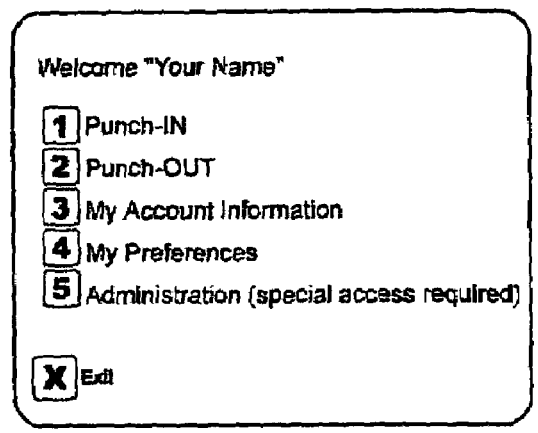
FIGS. 24A–24B illustrate typical screens that may be used on the display of the electronic terminal of FIG. 1 to set language preferences.
Figure 24B:
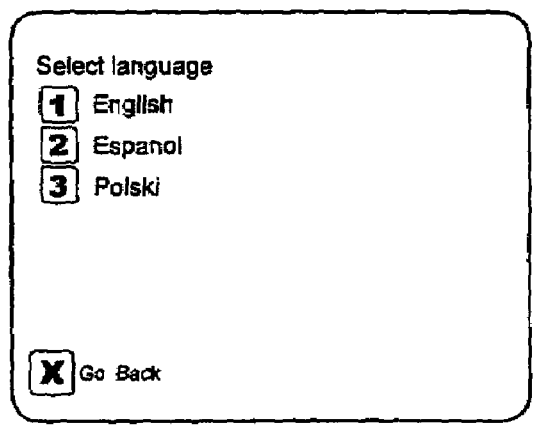

FIGS. 24A–24B illustrate the steps involved in the selection of a desired language after authentication. When presented with the main screen shown in FIG. 24A, the employee may choose to go to My Preferences by pressing the numeral 4 key on keypad 25. The screen in FIG. 24B then permits the employee to choose between the English, Spanish and Polish languages. If English is selected by pressing the numeral 1 key, the menu in FIG. 24A will thereafter be presented in the English language for that employee. The terminal 20 will remember each employee's language preference that is entered as a preference. Otherwise, terminal 20 will use English as the default language. If there is more than one terminal 20 at a site, certain of the terminals may be preset to an alternate language such as Spanish, i.e., Spanish may be the default language for that terminal.

FIGS. 25A–25D illustrate the steps for obtaining a payroll advance against currently accrued pay based upon the hours worked to date. After authenticating and selecting My Account Information on the main screen, the employee may be presented with the options shown in FIG. 25A, including "Get a Payroll Advance". When this option is selected by pressing the numeral 3 key on keypad 25, the APW system calculates the amount of credit that is available for this particular employee, such as by multiplying the accrued hours worked since the last payday and the employee's hourly compensation rate. This amount is then discounted by a risk factor that includes at least the amount of pay that is deducted for taxes and any other applicable deductions from gross pay. For example, in FIG. 25B, the employee may be notified of the maximum amount of payroll advance that is available. The employee is then prompted to enter the amount of payroll advance that is desired. After pressing the check key to submit the payroll advance request, a screen shown in FIG. 25C may appear advising the employee of service charge applicable to the payroll advance transaction. Some further identification to complete this transaction may also be requested such as a PIN number associated with the employee's bankcard. Upon submitting the PIN, a screen shown in FIG. 25D appears showing that the payroll advance has been approved and that the requested amount has been credited to the employee's bankcard account. The employee may print the screen of FIG. 25D by pressing the print key on keypad 25 (FIG. 9B) or go to the employee's card balance option in FIGS. 16A–16D to confirm that the payroll advance has been credited to his/her account and print the current balance from the screen in FIG. 16D.

A substantial problem in distributed labor management is inability to communicate with field force and inability to get immediate feedback from the work site. The APW system gives managers the ability to log into a secure web page, type a message and select a set of canned answers to be displayed to their remote employees. For example, the manager could write a quick message saying "Joe, please clean aisle 3 immediately after you punch in", then select (1) "Yes, consider it done", (2) "Can't", (3) "I need further detail", as the canned answers or responses for the work request. The manager would then press a button and the message, plus the canned responses are sent to the appropriate terminal 20. Upon punching-in at his work site, Joe is presented with the message sent from his manager, "Joe, please clean aisle 3 immediately after you punch-in". He would then respond to the message using one of the 3 three given options: (1) "Yes, consider it done", (2) "Can't", (3) "I need further detail". Thus, Joe's supervisor quickly determines whether this additional task will be completed by Joe, or whether additional resources are needed to complete the task.

Figure 26:
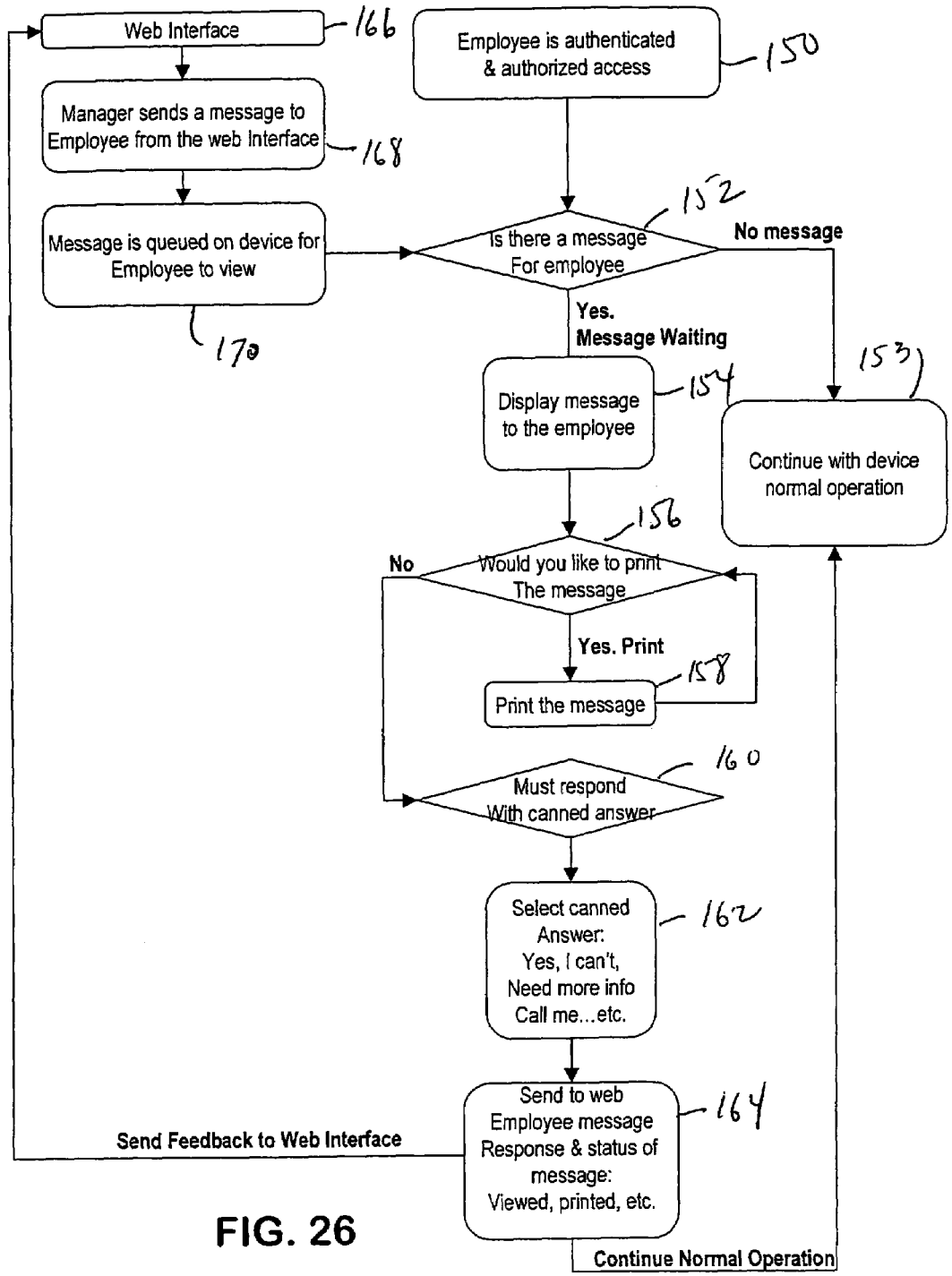
FIG. 26 is a flow chart of typical steps involved in interactive messaging, such as between a manager and an employee with the employee sending a reply to the manager from the electronic terminal.

The flow chart in FIG. 26 illustrates these steps in greater detail. A supervisor or manager may create and send a message at block 168, which is then sent to and queued on the terminal 20 that the employee will check-in on, at block 170. After authentication in block 150, if there is a message for the employee (block 152), the message is displayed (block 154). If there is no message at block 152, normal operation of terminal 20 proceeds at block 153. At block 156, the employee is invited to print the message and the message is printed at block 158, if so selected. The process then moves to block 160 which requires a response to the message, such as with canned answers. The employee selects the desired response at block 162, which is then sent via the internet or web to the individual who sent the message; typically a supervisor of the employee. A supervisor or manager may create and send a message at block 168, which is then sent to the terminal that the employee will check-in on, at block 170. The message is then ready for viewing upon authentication at block 152.

Figure 27:
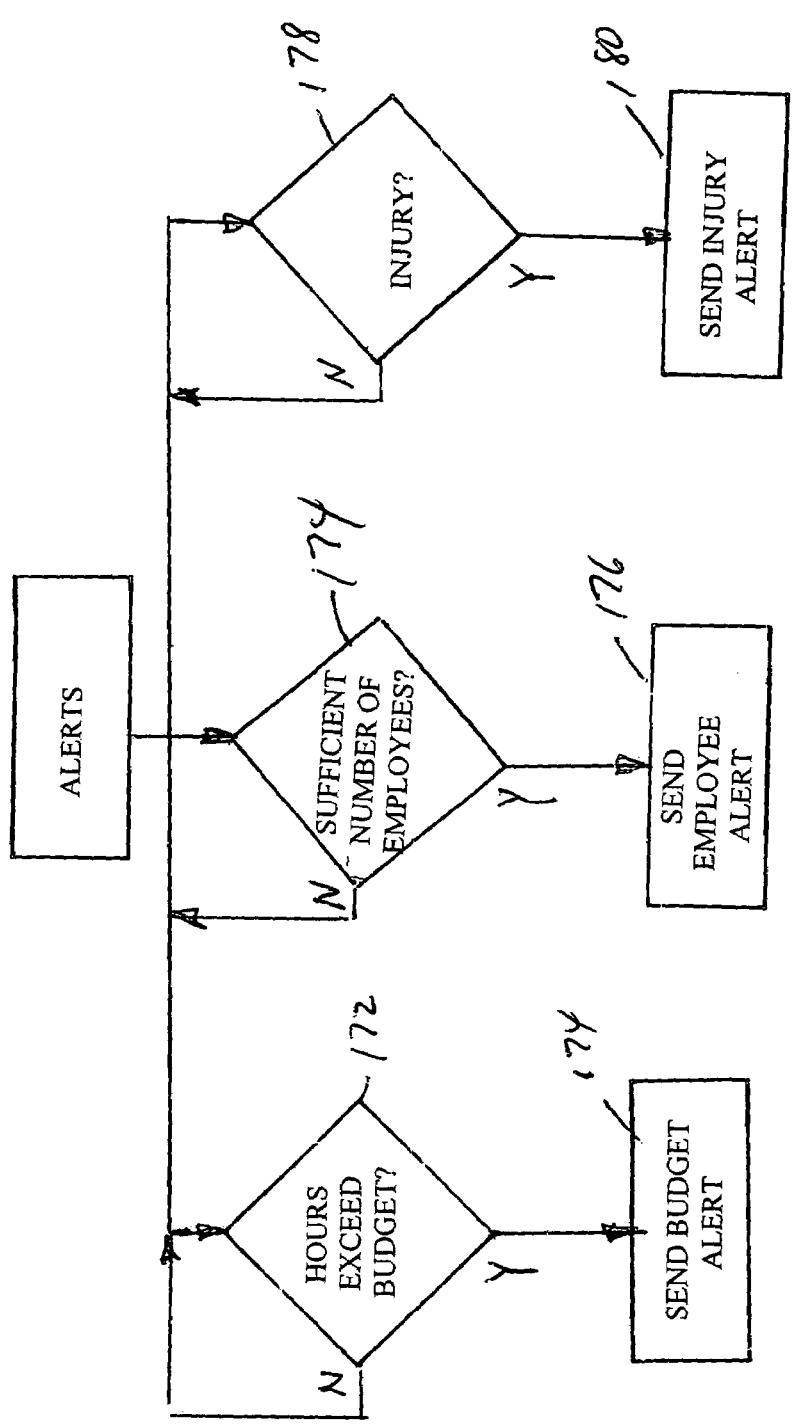
FIG. 27 is a flow chart of typical alerts that the system of the present invention may generate upon monitoring the system or upon employee input into the system.
Figure 28A:
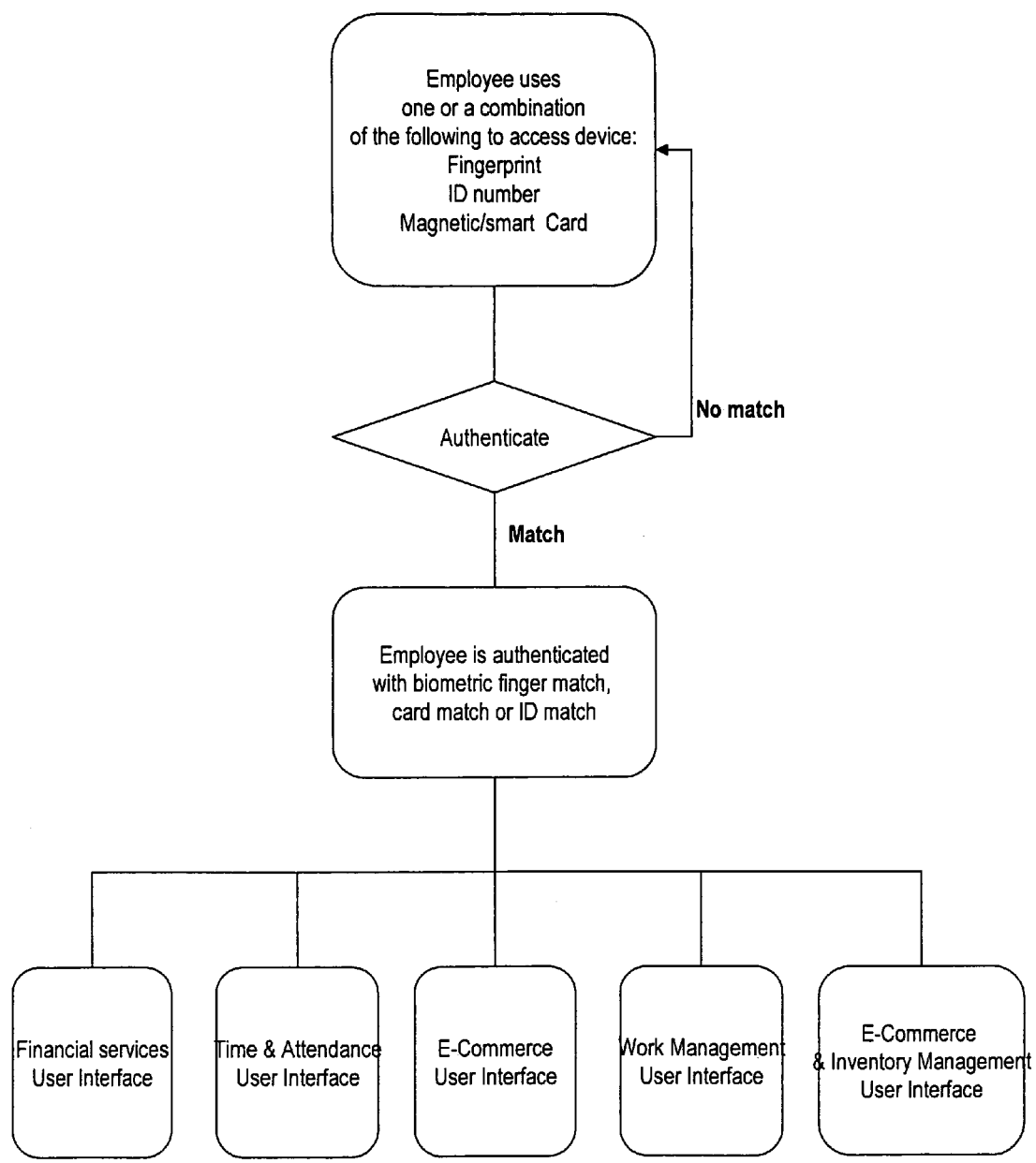
FIGS. 28A and 28B are a flow chart of typical steps involved in calculating and approving a payroll advance.
Figure 28B:
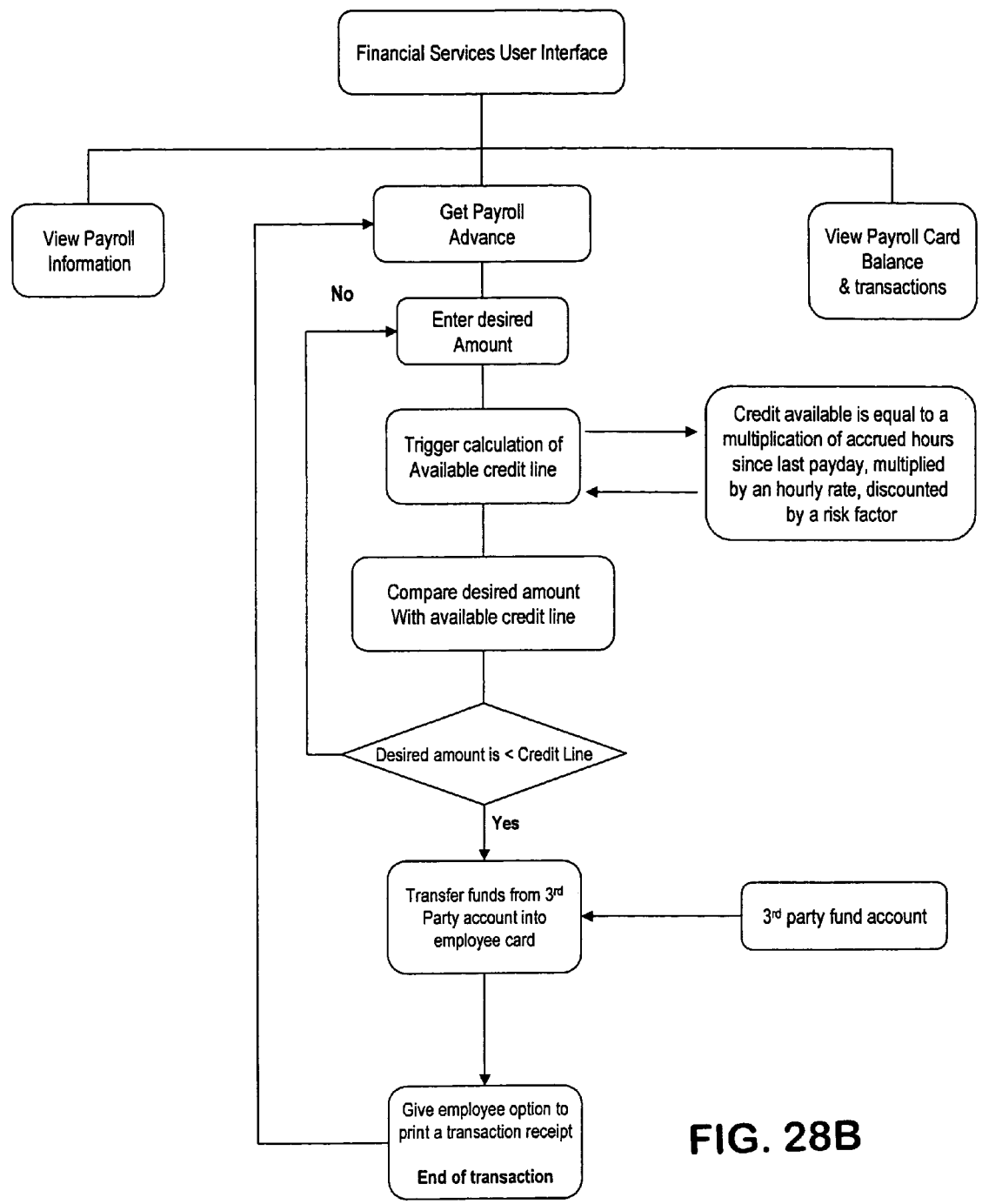
Figure 29:
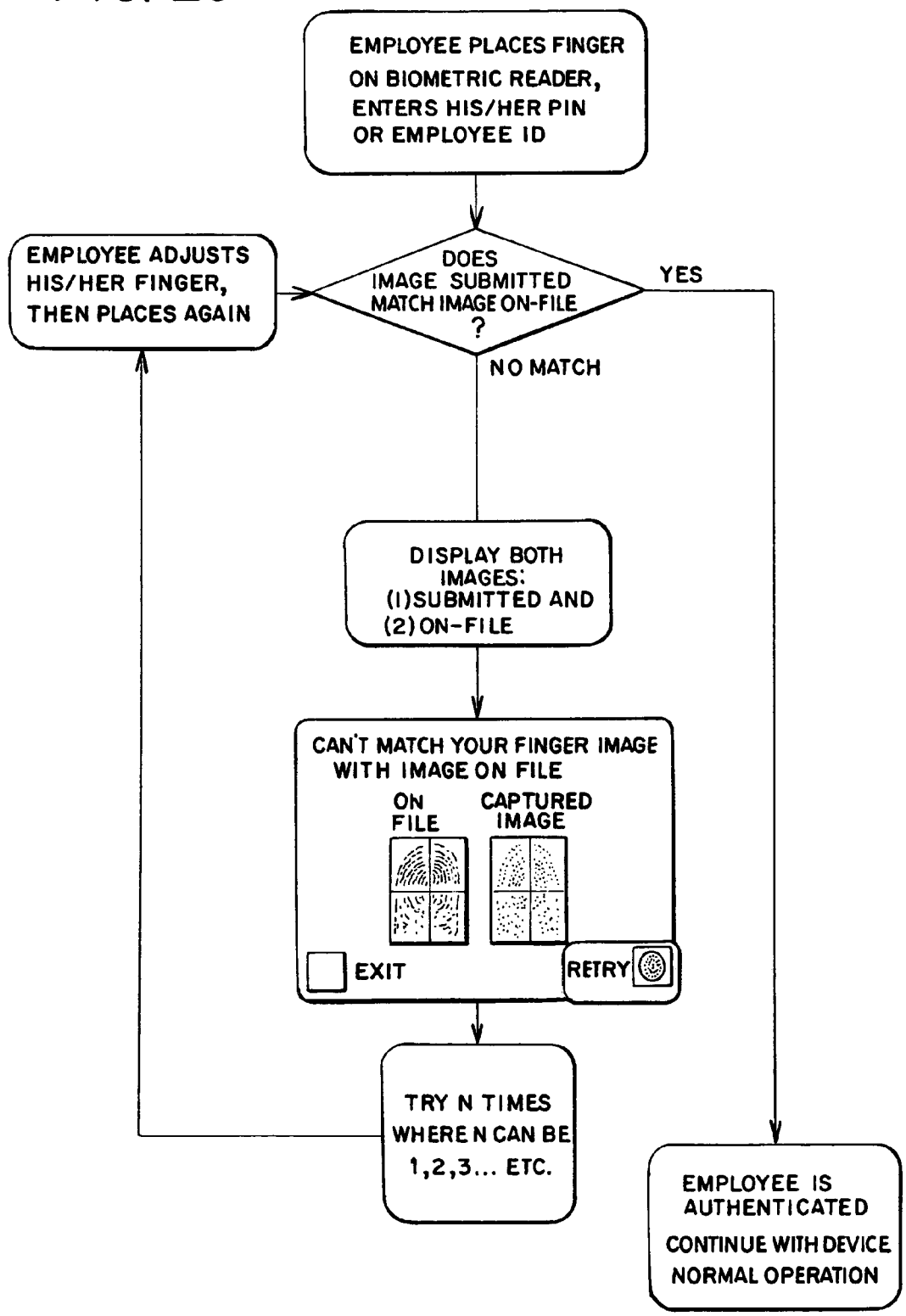
FIG. 29 is a flow chart that provides further detail on authentication with the fingerprint reader.

The APW system is also capable of providing a number of different kinds of alerts, such as those shown in FIG. 27. A substantial problem in distributed labor management is inability to manage thousands of employees, their hours and having ability to complete the work within allocated budgeted hours and budgeted dollars. As employees punch-in and punch-out, the system accumulates the amount of hours billed to a specific work location, job code or department code. When the number of hours exceeds a pre-set budgeted hour value (block 172 in FIG. 27), within a specific timespan (such as daily, weekly, bi-weekly or monthly budget), the system automatically alerts a manager or a hierarchy of managers (block 174) notifying them that hours budgeted have been exceeded. The same logic is true if the budgets were an amount in dollars, thus an alert is generated if the dollars spent at the work site, job code or department code have exceeded a budgeted dollar value. Alerts are generated from the local device, then routed via a central system and are delivered to individuals via email, text message, automated fax or automated text to speech synthesizer calling the alert recipient.

Another problem in distributed labor environment is the inability of the service provider to easily manage and track thousands of field employees and make sure that key employees are available and reporting to perform key tasks at customer sites. The system features an ability to notify a single manager or a hierarchy of managers if a single employee, or a set of employees are not present at a work site prior to predetermined time deadline. For example, the system generates an alert notification if a specific employee is not present by 8:00 AM to fix a burnt light bulb. Another example is that the system generates an alert notification if by 8:00 AM, only four out of the expected six cleaning employees are present at the customer's site, such as at block 174 in FIG. 27. Alerts are generated from the local device (block 176), then routed via a central system and are delivered to individuals via email, text message, automated fax or automated text to speech synthesizer calling the alert recipient.

The APW system can also accommodate miscellaneous alerts. For example, these alerts may be generated by an authorized employee using the system from a terminal 20. An authorized employee accesses the system, then uses the user interface at the terminal to initiate an alert, which is then routed to the appropriate manager or hierarchy of managers. For example, on his or her punch-out, the system may ask the employee if he/she had any accident today, such as at block 178 of FIG. 27. If the employee selects "No", then he/she punches out and no alert issues. If the employee answers "Yes", then an alert is immediately routed (block 180) to the appropriate manager who may need to investigate the issue further.

A substantial problem in distributed labor management is inability to communicate with field force and inability to get immediate feedback from the work site. The APW system gives managers the ability to log into a secure web page, type a message and select a set of canned answers to be displayed to their remote employees. For example, the manager could write a quick message saying "Joe, please clean aisle 3 immediately after you punch in", then select (1) "Yes, consider it done", (2) "Can't", (3) "I need further detail", as the canned answers or responses for the work request. The manager would then press a button and the message, plus the canned responses are sent to the appropriate terminal 20. Upon punching-in at his work site, Joe is presented with the message sent from his manager, "Joe, please clean aisle 3 immediately after you punch-in". He would then respond to the message using one of the 3 three given options: (1) "Yes, consider it done", (2) "Can't, (3) "I need further detail". Thus, Joe's supervisor quickly determines whether this additional task will be completed by Joe, or whether additional resources are needed to complete the task.

The flow chart in FIG. 26 illustrates these steps in greater detail. A supervisor or manager may create and send a message at block 168, which is then sent to and queued on the terminal 20 that the employee will check-in on, at block 170. After authentication in block 150, if there is a message for the employee (block 152), the message is displayed (block 154). If there is no message at block 152, normal operation of terminal 20 proceeds at block 153. At block 156, the employee is invited to print the message and the message is printed at block 158, if so selected. The process then moves to block 160 which requires a response to the message, such as with canned answers. The employee selects the desired response at block 162, which is then sent via the internet or web to the individual who sent the message; typically a supervisor of the employee. A supervisor or manager may create and send a message at block 168, which is then sent to the terminal that the employee will check-in on, at block 170. The message is then ready for viewing upon authentication at block 152.

In some of the foregoing examples of the implementation of various functions with terminal 20, the keypad 25 was used to enter the selected choice on the various menus and to navigate from one screen to the next, or the like. Of course, display 21 may be a touch-sensitive display that automatically selects the option that is touched on the screen, rather than requiring entry of an associated key on keypad 25 to initiate the desired function or screen.

While particular embodiments of the invention have been shown and described, it will be apparent to those skilled in the art that changes and modifications may be made therein without departing from the invention in its broader aspects, and, therefore, the aim of the appended claims is to cover all such changes and modifications as fall within the true spirit and scope of the invention.

The invention claimed is:

1. An electronic payroll system for processing a payroll, comprising:
    a data processor,
    a memory for storing the names of a plurality of employees, the pay rate for each of the plurality of employees, a unique identifying account number for each of the plurality of employees, a personal identification number associated with each account number, biometric data that uniquely identifies each of the plurality of employees, and for storing the check-in and checkout times for each of the plurality of employee,
    a card coded with one of the unique identifying account numbers assigned to each of the plurality of employees,
    a personal identification number assigned to each of the plurality of employees and associated with each unique identifying account number, and
    an electronic terminal having a card reader for reading the coded unique identifying account number on the card, having a plurality of entry keys for entering the personal identification number, having biometric means for receiving unique biometric data for each of the plurality of employees, and having means for communicating the unique identifying account number and the personal identification number or the unique biometric data to the data processor,
    said data processor in communication with said electronic terminal to receive the unique identifying account number and personal identification number, to compare said account number and personal identification number as received from said electronic terminal and said memory to determine if said account number and personal identification number correspond to a set of numbers stored in the memory for one of the plurality of employees, or to compare biometric data received from said biometric determining means with biometric data previously stored in said memory and, if a correspondence is determined for said sets of numbers or for said stored biometric data, to authenticate the identified employee and to use the current time as a payroll check-in or checkout time for the identified employee.

2. The electronic payroll system in accordance with claim 1 further comprising:
    a viewable display disposed on said terminal for displaying different selectable options including a view payroll option, and
    said terminal responsive to selection of the view payroll option to display the payroll for the identified employee at the terminal.

3. The electronic payroll system in accordance with claim 1 further comprising:
    a printer disposed in said electronic terminal, and
    a viewable display disposed on said terminal f or displaying different selectable options including a print payroll option,
    said terminal responsive to selection of the print payroll option to print a pay stub for the identified employee at the terminal.

4. The electronic payroll system in accordance with claim 1 further comprising:
    an automatic teller machine terminal associated with a bank,
    a printer disposed in said automatic teller machine terminal, and
    a viewable display disposed on said automatic teller machine terminal for displaying different selectable options including a print payroll option, and
    said automatic teller machine terminal responsive to selection of the print payroll option to print a payroll stub at the automatic teller machine.

5. The electronic payroll system in accordance with claim 1 further comprising:
    a viewable display disposed on said terminal for displaying different selectable options including a view new work assignments and/or instructions option,
    said terminal responsive to selection of the view new work assignments and/or instructions option to display the new work assignments and/or instructions.

6. The electronic payroll system in accordance with claim 5 further comprising:

a printer disposed in said electronic terminal, said viewable display disposed on said terminal for also displaying a print work assignment and/or instructions option, said terminal responsive to selection of the print new work assignments and/or instructions option to print the new work assignments and/or instructions at the terminal.

7. The electronic payroll system in accordance with claim 1 further comprising:

a viewable display disposed on said terminal for displaying different selectable options including a transfer funds option, said display prompting entry the amount to be transferred and a designated account number to which funds are to be transferred, said terminal responsive to selection of the transfer funds option to transfer funds from the account of the identified employee to the designated account.

8. The electronic payroll system in accordance with claim 1 further comprising:

a viewable display disposed on said terminal, said display prompting the identified employee to enter time information for a previously missed check in time or a previously missed checkout time.

9. The electronic payroll system in accordance with claim 1 further comprising:

a viewable display disposed on said terminal, said display prompting an administrator to approve of the time entered by an identified employee for a previously missed check in time or a previously missed checkout time.

10. The electronic payroll system in accordance with claim 1 further comprising:

a viewable display disposed on said terminal for displaying different selectable options including a payroll advance option, said display prompting entry the amount of a requested payroll advance against accrued net pay when the payroll advance option is selected, said terminal responsive to selection of the payroll advance option to transfer the requested payroll advance into the account of the identified employee.

11. The electronic terminal in accordance with claim 1 wherein said biometric means is a fingerprint reader.

12. The electronic terminal in accordance with claim 11 wherein said electronic terminal communicates fingerprint data to said data processor.

13. A method of processing a payroll in an electronic payroll system, said electronic payroll system including a data processor, a memory for storing the names of each of a plurality of employees, the pay rate for each of the plurality of employee, a unique identifying account number assigned to each of the plurality of employees, a personal identification number associated with each account number, biometric data that uniquely identifies each of the plurality of employees, the check-in and checkout times of each of the plurality of employees, a card coded with one of the unique identifying account numbers assigned to each of the plurality of employees, a personal identification number assigned to each of the plurality of employees and associated with each unique identifying account number, and an electronic terminal with a card reader for reading the account number coded on the card, a biometric means for receiving biometric data from one of the plurality of employees, with a plurality of entry keys for entering the personal identification number and means to communicate between said electronic terminal and said data processor, said method comprising the steps of:

communicating said account number from the electronic terminal to the data processor, communicating the personal identification number from the electronic terminal to the data processor, and comparing the account number and personal identification number with sets of numbers stored in the memory for at least some of the employees, or communicating the received biometric data from the electronic terminal to the data processor, and comparing the received biometric data with biometric data stored in the memory, and using the current time as a payroll checkin or payroll checkout status for an employee if the account number and personal identification number correspond to a set of numbers stored in the memory for that employee or if the received biometric data corresponds to the biometric data stored in memory for an employee.

14. The method in accordance with claim 13 comprising the additional steps of:

calculating the amount of time between checkin and checkout times for each employee, calculating the amount of pay for each employee based upon the time between payroll check-in and payroll checkout and the pay rate for each employee, and transmitting the calculated amount of net pay for each employee to a bank that issued the bank cards.

15. The method in accordance with claim 14 comprising the additional step of:

crediting each unique identifying account number with the calculated net pay for those employees having net pay.

16. The method in accordance with claim 15 comprising the additional step of:

printing a copy of the previously calculated payroll associated with a unique account number at the electronic terminal after the data processor has authenticated the account number and personal identification number of an employee.

17. An electronic terminal for use in an electronic payroll system for processing a payroll, the system including a data processor with a memory for storing the names of a plurality of employees, the pay rate for each of the plurality of employees, a unique identifying account number for each of the plurality of employees, a personal identification number associated with each account number, biometric data that uniquely identifies each of the plurality of employees and the check-in and checkout times of each employee, a card coded with one of the unique identifying account numbers assigned to each of the plurality of employees and a personal identification number assigned to each of the plurality of employees and associated with each unique identifying account number, said electronic terminal comprising:

a card reader for reading the coded unique identifying number on the card, a plurality of entry keys for entering the personal identification number assigned to each employee and associated with each unique identifying account number, a biometric means to receive biometric data that uniquely identifies each of the plurality of employees, a viewable display disposed on said electronic terminal for displaying a plurality of options including check-in to work and checkout of work, means for selecting one of said plurality of options displayed on said display including a check-in to work or checkout of work option, electronic communication means disposed in said electronic terminal to communicate one or more of said unique identifying account numbers, said personal identification number, or the biometric data from the employee, and the time of check-in to work or the time of checkout of work to said data processor.

18. The electronic terminal in accordance with claim 17 further comprising:
a printer disposed in said electronic terminal,
said viewable display disposed on said terminal displays a view payroll option and a print payroll option,
said means for selecting one of the different selectable options on said display including the view payroll option and the print payroll option, and a payroll stub may be printed by selecting the print payroll option.

19. The electronic terminal in accordance with claim 17 further comprising:
a viewable display disposed on said terminal for displaying different selectable options including a view payroll option, and
said terminal responsive to selection of the view payroll option to display the payroll for the identified employee at the terminal.

20. The electronic terminal in accordance with claim 17 further comprising:
a printer disposed in said electronic terminal, and
a viewable display disposed on said terminal for displaying different selectable options including a print payroll option,
said terminal responsive to selection of the print payroll option to print a pay stub for the identified employee at the terminal.

21. The electronic terminal in accordance with claim 17 further comprising:
an automatic teller machine terminal associated with a bank,
a printer disposed in said automatic teller machine terminal, and
a viewable display disposed on said automatic teller machine terminal for displaying different selectable options including a print payroll option, and
said automatic teller machine terminal responsive to selection of the print payroll option to print a payroll stub at the automatic teller machine.

22. The electronic terminal in accordance with claim 17 further comprising:
a viewable display disposed on said terminal for displaying different selectable options including a view new work assignments and/or instructions option,
said terminal responsive to selection of the view new work assignments and/or instructions option to display the new work assignments and/or instructions.

23. The electronic terminal in accordance with claim 22 further comprising:
a printer disposed in said electronic terminal,
said viewable display disposed on said terminal for also displaying a print work assignment and/or instructions option,
said terminal responsive to selection of the print new work assignments and/or instructions option to print the new work assignments and/or instructions at the terminal.

24. The electronic terminal in accordance with claim 17 further comprising:
a viewable display disposed on said terminal for displaying different selectable options including a transfer funds option,
said display prompting entry the amount to be transferred and a designated account number to which funds are to be transferred,
said terminal responsive to selection of the transfer funds option to transfer funds from the account of the identified employee to the designated account.

25. The electronic terminal in accordance with claim 17 further comprising:
a viewable display disposed on said terminal,
said display prompting the identified employee to enter time information for a previously missed check in time or a previously missed checkout time.

26. The electronic terminal in accordance with claim 17 further comprising:
a viewable display disposed on said terminal,
said display prompting an administrator to approve of the time entered by an identified employee for a previously missed check in time or a previously missed checkout time.

27. The electronic terminal in accordance with claim 17 further comprising:
a viewable display disposed on said terminal for displaying different selectable options including a payroll advance option,
said display prompting entry the amount of a requested payroll advance against accrued net pay when the payroll advance option is selected,
said terminal responsive to selection of the payroll advance option to transfer the requested payroll advance into the account of the identified employee.

28. The electronic terminal in accordance with claim 17 wherein said biometric means is a fingerprint reader.

29. The electronic terminal in accordance with claim 28 wherein said electronic terminal communicates fingerprint data with said data processor for each employee.

30. An electronic payroll system for processing a payroll, comprising:
a data processor,
a memory for storing the names of a plurality of employees, the pay rate for each of the plurality of employees, the check-in and checkout times of each of the plurality of employees, and unique biometric data for each of the plurality of employees,
an electronic terminal with a microprocessor,
biometric means associated with said terminal for receiving unique biometric data from each of the plurality of employees,
said microprocessor in communication with said biometric means to receive said unique biometric data and to communicate said biometric data to said data processor,
said data processor comparing the unique biometric data to biometric data stored in the memory to determine the identity of one of the plurality of employees, and to use the present time as a check-in or checkout time for that employee, and
a viewable display disposed on said terminal for displaying different selectable options including a view payroll option, and
said terminal responsive to selection of the view payroll option to display the payroll for the identified employee at the terminal.

31. The electronic payroll system in accordance with claim 30 further comprising:
a printer disposed in said electronic terminal, and
a viewable display disposed on said terminal for displaying different selectable options including a print payroll option, said terminal responsive to selection of the print payroll option to print a pay stub for the identified employee at the terminal.

32. The electronic payroll system in accordance with claim 30 further comprising:
an automatic teller machine terminal associated with a bank,
a printer disposed in said automatic teller machine terminal, and
a viewable display disposed on said automatic teller machine terminal for displaying different selectable options including a print payroll option, and
said automatic teller machine terminal responsive to selection of the print payroll option to print a payroll stub at the automatic teller machine.

33. The electronic payroll system in accordance with claim 30 further comprising:
a viewable display disposed on said terminal for displaying different selectable options including a view new work assignments and/or instructions option,
said terminal responsive to selection of the view new work assignments and/or instructions option to display the new work assignments and/or instructions.

34. The electronic payroll system in accordance with claim 30 further comprising:
a printer disposed in said electronic terminal,
said viewable display disposed on said terminal for also displaying a print work assignment and/or instructions option,
said terminal responsive to selection of the print new work assignments and/or instructions option to print the new work assignments and/or instructions at the terminal.

35. The electronic payroll system in accordance with claim 30 further comprising:
a viewable display disposed on said terminal for displaying different selectable options including a transfer funds option,
said display prompting entry the amount to be transferred and a designated account number to which funds are to be transferred,
said terminal responsive to selection of the transfer funds option to transfer funds from the account of the identified employee to the designated account.

36. The electronic payroll system in accordance with claim 30 further comprising:
a viewable display disposed on said terminal,
said display prompting the identified employee to enter time information for a previously missed check in time or a previously missed checkout time.

37. The electronic payroll system in accordance with claim 30 further comprising:
a viewable display disposed on said terminal,
said display prompting an administrator to approve of the time entered by an identified employee for a previously missed check in time or a previously missed checkout time.

38. The electronic payroll system in accordance with claim 30 further comprising:
a viewable display disposed on said terminal for displaying different selectable options including a payroll advance option,
said display prompting entry the amount of a requested payroll advance against accrued net pay when the payroll advance option is selected,
said terminal responsive to selection of the payroll advance option to transfer the requested payroll advance into the account of the identified employee.

39. The electronic payroll system in accordance with claim 30 wherein said biometric means is a fingerprint reader.

40. The electronic payroll system in accordance with claim 30 wherein said electronic terminal communicates fingerprint data to said data processor for each of the plurality of employees.

41. A method of processing a payroll in an electronic payroll system, said electronic payroll system including a data processor and a first memory for storing the names of a plurality of employees, the pay rate for each employee and the check-in and checkout times for each of the plurality of employees, and an electronic terminal with a microprocessor having a second memory for storing unique biometric data for each of the plurality of the employees, said method comprising the steps of:
receiving biometric data from an employee at the terminal,
communicating the biometric data to a microprocessor,
comparing the received biometric data to biometric data previously stored in a the second memory for one of the plurality of employees,
using the current time as a check-in or checkout time for an employee if there is a match of biometric data for that employee, and
communicating the check-in or checkout status for that employee from said terminal to said data processor, and
printing a copy of a pay stub for an account number at the electronic terminal after the microprocessor has authenticated an employee.

42. An electronic terminal for use in an electronic payroll system for processing a payroll, the system including a data processor with a first memory for storing the names of a plurality of employees, the pay rate for each of the plurality of employees, and the check-in and checkout times for each of the plurality of employees, said electronic terminal comprising:
a microprocessor,
a second memory for storing the unique biometric data for each of the plurality of employees,
biometric means associated with said terminal for receiving unique biometric data from each of the plurality of employees,
a viewable display disposed on said electronic terminal for displaying a plurality of options including check-in to work and checkout of work,
means for selecting one of said plurality of options displayed on said display including check-in to work and checkout of work,
said microprocessor in communication with said biometric means to receive said unique biometric data and to compare the received biometric data to the biometric data previously stored in the second memory to determine the identity of an employee,
said microprocessor using the current time as an employee check-in or check-out time for that employee if the received biometric data corresponds to biometric data previously stored in said second memory,
said microprocessor communicating the check-in time or the checkout time to said data processor, and
a viewable display disposed on said terminal for displaying different selectable options including a view payroll option, and said terminal responsive to selection of the view payroll option to display the payroll for the identified employee at the terminal.

43. The electronic terminal in accordance with claim 42 further comprising:
   a printer disposed in said electronic terminal, and
   a viewable display disposed on said terminal for displaying different selectable options including a print payroll option,
   said terminal responsive to selection of the print payroll option to print a pay stub for the identified employee at the terminal.

44. The electronic terminal in accordance with claim 42 further comprising:
   an automatic teller machine terminal associated with a bank,
   a printer disposed in said automatic teller machine terminal, and
   a viewable display disposed on said automatic teller machine terminal for displaying different selectable options including a print payroll option, and
   said automatic teller machine terminal responsive to selection of the print payroll option to print a payroll stub at the automatic teller machine.

45. The electronic terminal in accordance with claim 42 further comprising:
   a viewable display disposed on said terminal for displaying different selectable options including a view new work assignments and/or instructions option,
   said terminal responsive to selection of the view new work assignments and/or instructions option to display the new work assignments and/or instructions.

46. The electronic terminal in accordance with claim 45 further comprising:
   a printer disposed in said electronic terminal,
   said viewable display disposed on said terminal for also displaying a print work assignment and/or instructions option,
   said terminal responsive to selection of the print new work assignments and/or instructions option to print the new work assignments and/or instructions at the terminal.

47. The electronic terminal in accordance with claim 42 further comprising:
   a viewable display disposed on said terminal for displaying different selectable options including a transfer funds option,
   said display prompting entry the amount to be transferred and a designated account number to which funds are to be transferred,
   said terminal responsive to selection of the transfer funds option to transfer funds from the account of the identified employee to the designated account.

48. The electronic terminal in accordance with claim 42 further comprising:
   a viewable display disposed on said terminal,
   said display prompting the identified employee to enter time information for a previously missed check in time or a previously missed checkout time.

49. The electronic terminal in accordance with claim 42 further comprising:
   a viewable display disposed on said terminal,
   said display prompting an administrator to approve of the time entered by an identified employee for a previously missed check in time or a previously missed checkout time.

50. The electronic terminal in accordance with claim 42 further comprising:
   a viewable display disposed on said terminal for displaying different selectable options including a payroll advance option,
   said display prompting entry the amount of a requested payroll advance against accrued net pay when the payroll advance option is selected,
   said terminal responsive to selection of the payroll advance option to transfer the requested payroll advance into the account of the identified employee.

51. The electronic terminal in accordance with claim 42 wherein said biometric means is a fingerprint reader.

52. The electronic terminal in accordance with claim 51 wherein said electronic terminal communicates biometric data in the form of fingerprint data with said data processor for each employee.

* * * * *